United States Patent
Dong

(10) Patent No.: US 9,794,947 B2
(45) Date of Patent: Oct. 17, 2017

(54) CELL INTERFERENCE COORDINATION METHOD, BASE STATION AND TERMINAL

(71) Applicants: YULONG COMPUTER TELECOMMUNICATION SCIENTIFIC (SHENZHEN) CO., LTD., Shenzhen, Guangdong (CN); DONGGUAN YULONG TELECOMMUNICATION TECH CO., LTD., Guandong (CN)

(72) Inventor: Xiandong Dong, Guangdong (CN)

(73) Assignees: Yulong Computer Telecommunication Scientific (Shenzhen) Co., Ltd., Shenzhen, Guangdong (CN); Dongguan Yulong Telecommunication Tech Co., Ltd., Dongguan (CN)

( * ) Notice: Subject to any disclaimer, the term of this patent is extended or adjusted under 35 U.S.C. 154(b) by 11 days.

(21) Appl. No.: 14/897,359

(22) PCT Filed: Aug. 8, 2013

(86) PCT No.: PCT/CN2013/081110
§ 371 (c)(1),
(2) Date: Dec. 10, 2015

(87) PCT Pub. No.: WO2015/018042
PCT Pub. Date: Feb. 12, 2015

(65) Prior Publication Data
US 2016/0135195 A1 May 12, 2016

(51) Int. Cl.
*H04W 72/08* (2009.01)
*H04W 52/02* (2009.01)
(Continued)

(52) U.S. Cl.
CPC ........... *H04W 72/082* (2013.01); *H04W 4/06* (2013.01); *H04W 24/02* (2013.01);
(Continued)

(58) Field of Classification Search
CPC .... H04W 72/082; H04W 76/046; H04W 4/06
See application file for complete search history.

(56) References Cited

U.S. PATENT DOCUMENTS

2007/0066273 A1* 3/2007 Laroia ............... H04W 52/0235
455/343.2
2007/0072600 A1* 3/2007 Cho ..................... H04L 45/123
455/423
(Continued)

FOREIGN PATENT DOCUMENTS

| CN | 102111816 A | 6/2011 |
| CN | 102761902 A | 10/2012 |
| WO | 2012089162 A1 | 7/2012 |

OTHER PUBLICATIONS

Huawei: "Energy Saving solution enhancement", 3GPP Draft; R3-111148 Enegry Saving Solution Enhancement V0, 3rd Generation Partnership Project (3GPP), Mobile Competence Centre; 650, Route Des Lucioles; F-06921 Sophia-Antipolis Cedex; France, vol. RAN WG3, no. Barcelona, Spain; 20110509, Apr. 29, 2011, XP050498026.

*Primary Examiner* — Jamal Javaid
(74) *Attorney, Agent, or Firm* — Young Basile Hanlon & MacFarlane, P.C.

(57) ABSTRACT

A cell interference coordination method and a base station include a base station stopping sending other information other than pilot information after the base station switches to a dormant state from a work state. A cell interference coordination method and a terminal are also included. By means of the technical solution, the base station is enabled to send pilot information when in a dormant state, thereby (Continued)

avoiding bringing interference for other base stations, and also enabling a terminal to awaken the dormant base station according to the received pilot information as required.

14 Claims, 7 Drawing Sheets

(51) Int. Cl.
*H04W 4/06* (2009.01)
*H04W 76/04* (2009.01)
*H04W 24/02* (2009.01)
*H04W 48/12* (2009.01)
*H04W 88/08* (2009.01)

(52) U.S. Cl.
CPC ..... *H04W 52/0206* (2013.01); *H04W 76/046* (2013.01); *H04W 48/12* (2013.01); *H04W 88/08* (2013.01); *Y02B 60/50* (2013.01)

(56) References Cited

U.S. PATENT DOCUMENTS

| 2011/0244867 | A1 | 10/2011 | Zhao | |
|---|---|---|---|---|
| 2012/0106349 | A1* | 5/2012 | Adjakple | H04W 52/0206 |
| | | | | 370/241 |
| 2014/0050133 | A1* | 2/2014 | Jafarian | H04W 74/085 |
| | | | | 370/311 |

* cited by examiner

CELL INTERFERENCE COORDINATION METHOD, BASE STATION AND TERMINAL

TECHNICAL FIELD

The present disclosure relates to communication technology field, and particularly to a cell interference coordination method, a base station, and a terminal.

BACKGROUND

In 3GPP release-11 (3GPP Rel-11) and previous versions, some subject researches for interference elimination have been performed for Picocells and Femtocells. The Picocell provides a solution for distributing hotspot services. According to study, it can be determined that comparing to a Macrocell, emission power of the Picocell is smaller, and the Picocell cannot effectively distribute services, and load of the Picocell is only 60%. Therefore, 3GPP provides a cell range expansion (CRE) technology. By setting an access bias, terminals have priority access to a cell having the Picocell. However, in CRE regions, the terminals which have access to the Picocell service may receive a great interference power from the macrocell. For this, 3GPP has developed Eicic and Feicic subjects. By way of almost bland subframe (ABS) technology, control signals of the macrocell and the Picocell are time multiplexed, which can ensure reliability of control signal channels.

The Femtocell is a family base station established by users, and connected to core network via ADSL or other. The Femtocells are established randomly in doors. Without network planning of an operator, a number of Femtocells may be arranged closely. The Femtocell always employs close subscribe group (CSG) configurations, that is, only provides services for authorized users. The Femtocell can bring great interference for nearby unauthorized users. For this problem, 3GPP develops interference management manners, e.g., power control of the Femtocell, frequency multiplexing of control signal channels, to solve interference problems. However, these interference management manners cannot work well in the region where the Femtocells are distributed densely.

To provide better coverage and service distribution, a number of micro cells may be established densely, and mutual interference is very great. Some companies provide a cell on and off manner to close the cells where data transmission is temporarily not needed to eliminate interference.

However, when the cells where data transmission is not needed are directly closed, terminals cannot search the cells in the dormant state, and cannot awaken the cells when data transmission is needed.

SUMMARY

Based on at least one of the above mentioned problems, the present invention provides a new cell interference coordination method, which can cause the base station to send pilot information when in a dormant state, thereby avoiding bringing interference for other base stations, and also enabling a terminal to awaken the dormant base station according to the received pilot information as required.

The present invention provides a cell interference coordination method which includes a base station stopping sending other information other than pilot information after the base station switches to a dormant state from a work state.

In the technical solution, after the base station switches to the dormant state from the work state, the base station stops sending other information other than the pilot information, which can eliminate interference for other base stations caused by the above-mentioned other information which is sent by the base station, and for the base station data and/or voice service is temporarily not needed. Also a terminal can find the dormant base station according to the pilot information sent by the base station, which can ensure that when the terminal needs the data transmission and/or voice service, the terminal can awaken the base station in time.

In the technical solution, preferably, the method further includes the base station switching to the dormant state from the work state when the base station determines that the base station satisfies a preset state switch condition. Wherein, the state switch condition includes that in the cell there is no terminal in an active state and no terminal in an idle state, or in the cell there is no terminal in the active state, or in the cell there is only one or more terminals in the idle state and there is one or more other cells where the one or more terminals in the idle state can reside, or in the cell there is one or more terminals in the active state and one or more terminals in the idle state and there is one or more other cells where the one or more terminals in the active state and the one or more terminals in the idle state can reside.

In the technical solution, the states of the terminals in the cell corresponding to the base station are analyzed, which can ensure that sleeping of the base station will bring least possible influence for the terminals, thereby ensuring that users can obtain good usage experience.

In the technical solution, preferably, the method further includes the base station sending the pilot information via a part of antenna ports.

In the technical solution, in the dormant state, the base station can send the pilot information normally. As the pilot information can cause great interference, when in the dormant state the base station sends the pilot information only via a part of the antenna ports, it can make sure that the terminal can find the dormant base station and interference for other unsleeping cells brought by the base station can be reduced. Specifically, the sequence numbers of the antenna ports which can be used to send GRS pilot information are respectively 0, 1, 2, and 3, and then any one, any two, or any three of the antenna ports can be selected to send the GRS pilot information. Comparing to that all the antenna ports are used to send the pilot information, apparently, the above solution can effectively reduce interference for other base stations.

In the technical solution, preferably, when the pilot information is the cell-specific reference signal, the antenna port which sequence number is 2 or 3 can be selected, or the antenna ports which sequence numbers are respectively 2 and 3 can be selected.

In the technical solution, when the base station decides to select a part of the antenna ports to send the pilot information, the base station can preferably select the antenna port the pilot information sent by which may not bring interference or bring least interference for other unsleeping cells, to reduce interference for other unsleeping cells. When the pilot information is the cell-specific reference signal, selecting the antenna port which sequence number is 2 or 3, or selecting the antenna ports which sequence numbers are respectively 2 and 3 can effectively reduce interference for other unsleeping cells which is caused by the pilot information, thereby increasing communication quality in the other unsleeping cells.

In the technical solution, preferably, the method further includes the base station receiving an awakening request, and switching from the dormant state to the work state.

In the terminal, the awakening request received by the base station can be the request sent by the terminal. For example, when the terminal needs data access service, voice call service, and other services, the terminal sends the awakening request, or when the network informs the terminal via the cell where the terminal resides, after determination, the terminal sends the awakening request to the dormant base station. When the base station receives the awakening request, the base station switches from the dormant state to the work state, which can make sure that when the terminal needs the base station to provide the data and/or voice service, the terminal can awaken the dormant base station in time, thereby ensuring real-time communication of the terminal and enhancing work performance of the base station.

In the technical solution, preferably, the method further includes the base station switching from the dormant state to the work state once the base station receives the awakening request, or switching from the dormant state to the work state when the base station receives a number of awakening requests from a number of terminals within a preset time interval, or switching from the dormant state to the work state when the base station determines that the base station cannot bring interference for other base stations.

In the technical solution, when the base station receives the awakening request, the base station switches from the dormant state to the work state, so as to make sure that the terminal can communicate with others well. Preferably, when the terminal sends the awakening request, the terminal may send the awakening request to a number of base stations at the same time. To avoid awakening a number of base stations and avoid mutual interference, thus when the base station receives a number of awakening requests from a number of terminals within the preset time interval, the base station switches from the dormant state to the work state, which can make sure that there are enough service requests after the base station is awakened. Also, as the number of awakened based stations is reduced, mutual interference among a number of base stations can be avoided, and power consumption of the base station is also reduced. Furthermore, when the base station receives the awakening request and determines that the base station cannot bring interference for other base stations, the base station switches from the dormant state to the work state, which can enhance work performance of the base station.

In the technical solution, preferably, the process of the base station determining whether or not the base station can bring interference for other base stations includes the following. The base station obtains real time state information of a designated base station, and/or obtain a characteristic parameter of signals from the designated base station. Wherein, when the designated base station is in the dormant state, and/or when the value of the characteristic parameter is less than or equals to a preset parameter threshold, it is determined that the base station cannot bring interference for the designated base station.

In the technical solution, the base station determines whether or not the base station can bring interference for other stations, which may enable the base station to switch from the dormant state to the work state when the base station needs to be awakened and when it is determined that the base station cannot bring interference for other base stations, thus to a greatest degree interference among base stations can be reduced. The obtained real time state information of the designated base station includes the characteristic parameter of the designated base station when the designated base station is in the dormant or work state, and can be the characteristic parameter indicating signal intensity and signal to noise ratio of the designated base station, or one other characteristic parameter indicating signals of the designated base station.

In the above technical solution, preferably, after the base station receives the awakening request, the method further includes the base station generating and broadcasting an awakening notification message, and/or receiving one or more awakening notification messages from one or more other base stations. The awakening notification message generated by the base station at least include an identity of the base station and an identity of the sender sending the awakening request, and the awakening notification message indicates that the base station will switch from the dormant state to the work state according to the awakening request from the sender. Wherein, when the base station sends the awakening notification message and does not receive a corresponding response message, the base station switches from the dormant state to the work state. When the base station receives a response message, the base station negotiates with the sender sending the response message to finally determine which base station needs to switch from the dormant state to the work state. When the base station receives one awakening notification messages from one other base station, the base station returns a corresponding response message or makes no response.

In the technical solution, after the base station receives the awakening request, the base station generates and broadcasts the awakening notification message, which can be used to determine whether or not there are one or more other base stations which have received the same awakening request and are waiting for switching to the work state. After it is determined that there is no other base station which is waiting for switching to the work state, the base station switches from the dormant state to the work state. When it is determined that there are one or more other base stations which have received the same awakening request and are waiting for switching to the work state, by negotiation of the base stations, which base station needs to switch from the dormant state to the work state can be determined, which reduces the number of awakened base stations, reduces interference among base stations, thus an optimal technical solution for awakening base stations can be realized. Specifically, when the base stations negotiate with each other, the base station which can provide optimal signal quality for the terminal sending the awakening request may be selected, and/or the base station the number of the awakening requests received by which is greatest can be selected. The base stations can negotiate with each other via return links or air interface information.

In the technical solution, preferably, the awakening request includes information of all target base stations. When the awakening request is further sent to one or more other base stations, the cell interference coordination method further includes the base station directly negotiating with the one or more other base stations to finally determine which base station needs to switch from the dormant state to the work state.

In the technical solution, when the base station receives the awakening request from the terminal, the base station does not know whether or not there is one or more other base stations which have received the same awakening request, and also does not know which base station has received the awakening request. Therefore, by embedding identities of the other base stations which have received the awakening request into the awakening request, the base stations can directly negotiate with each other, which can make negotiation be meaningful and reduce delay caused by negotiation.

In the above technical solution, preferably, the method further includes the base station obtaining the awakening request from a designated time-frequency resource. The awakening request includes a designated preamble sequence.

In the technical solution, the base station obtains the awakening request from the designated time-frequency resource, and the awakening request includes the designated preamble sequence, which can enable the terminal to precisely determine which base station needs to be awakened, thereby avoiding awakening a number of base stations and accordingly avoiding mutual interference. In a same time-frequency resource there may be a number of base stations, and preamble sequences of the base stations in different time-frequency resource may be the same. Therefore, for the reason that the terminal can precisely determine which base station needs to be awakened, the base station can be set to receive the awakening request from the designated time-frequency resource, and the base station needed to be awaken can be precisely determined according to the preamble sequence of the awakening request. Certainly, those skilled in the art should understand that in communication technology preamble sequence, pilot information, reference symbols are just different descriptions for a same concept, and they are the same and equivalent in essence.

In the technical solution, preferably, the method further includes the base station sending an available time-frequency resource and an available set of preamble sequences of the base station before the base station switches from the work state to the dormant state.

In the technical solution, the base station can be uniquely identified by the time-frequency resource and the available set of preamble sequences of the base station. The base station sends the available time-frequency resource and the available set of preamble sequences of the base station before the base station switches from the work state to the dormant state, which can enable other stations and the terminal to determine which base station has entered the dormant state according to the received time-frequency resource and the received available set of preamble sequences. When the terminal needs to awake a designated base station, the terminal only needs to send the awakening request including the available preamble sequence of the designated base station via the time-frequency resource of the designated base station, and the terminal can precisely awaken the designated base station. While other base stations can determine which station has entered the dormant state according to the received time-frequency resource and the set of preamble sequences, thus the other base station can determine that the other base station cannot bring interference for the base station which has entered the dormant state.

In the technical solution, preferably, the pilot information sent by the dormant base station includes an available set of preamble sequences.

In the technical solution, the terminal sends the awakening request via the designated time-frequency resource. The base station sends the available set of preamble sequences when in the dormant state, thus a number of base stations using a same time-frequency resource can be distinguished from each other according to available preamble sequences (set of preamble sequences), which can enable the terminal to only awake a designated base station via a selection of the time-frequency resource and the preamble sequence when the terminal needs to awake a base station, thereby avoiding awakening too many base stations (for example, all the base stations using a same time-frequency resource) and accordingly avoiding mutual interference among base stations.

According to another aspect of the present invention, the present invention provides a base station which includes a data processing module configured to control the base station to switch from a work state to a dormant state, and a data interaction module configured to stop sending other information other than pilot information when the base station is in the dormant state.

In the technical solution, after the base station switches to the dormant state from the work state, the base station stops sending other information other than the pilot information, which can eliminate interference for other base stations caused by the above-mentioned other information which is sent by the base station, and for the base station data and/or voice service is temporarily not needed. Also a terminal can find the dormant base station according to the pilot information sent by the base station, which can ensure that when the terminal needs data transmission and/or voice service, the terminal can awaken the base station in time.

In the technical solution, preferably, the data processing module is further configured to determine whether or not the base station matches a preset state switch condition, and control the base station to switch from the work state to the dormant state when the determination result is yes. Wherein, the state switch condition includes that in the cell there is no terminal in an active state and no terminal in an idle state, or in the cell there is no terminal in the active state, or in the cell there is only one or more terminals in the idle state and there is one or more other cells where the one or more terminals in the idle state can reside, or in the cell there is one or more terminals in the active state and one or more terminals in the idle state and there is one or more other cells where the one or more terminals in the active state and the one or more terminals in the idle state can reside.

In the technical solution, the states of the terminals in the cell corresponding to the base station are analyzed, which can ensure that sleeping of the base station brings least possible influence for the terminals, thereby ensuring that users can obtain good usage experience.

In the technical solution, preferably, the data interaction module sends the pilot information only via a part of antenna ports.

In the technical solution, in the dormant state, the base station can send the pilot information normally. As the pilot information can cause greater interference, when in the dormant state the base station sends the pilot information only via a part of the antenna ports, it can make sure that the terminal can find the dormant base station and interference for other unsleeping cells brought by the base station can be reduced. Specifically, the sequence numbers of the antenna ports which can be used to send GRS pilot information are respectively 0, 1, 2, and 3, and then any one, any two, or any three of the antenna ports can be selected to send the GRS pilot information. Comparing to that all the antenna ports are used to send the pilot information, apparently, the above solution can effectively reduce interference for other base stations.

In the technical solution, preferably, when the pilot information is the cell-specific reference signal, the antenna port which sequence number is 2 or 3 can be selected, or the antenna ports which sequence numbers are respectively 2 and 3 can be selected.

In the technical solution, when the base station decides to select a part of the antenna ports to send the pilot information, the base station can preferably select the antenna port the pilot information sent by which may not bring interference or bring least interference for other unsleeping cells, to reduce interference for other unsleeping cells. When the pilot information is the cell-specific reference signal, selecting the antenna port which sequence number is 2 or 3, or selecting the antenna ports which sequence numbers are respectively 2 and 3 can effectively reduce interference for other unsleeping cells which is caused by the pilot information, thereby increasing communication quality of the other unsleeping cells.

In the technical solution, preferably, the data interaction module is further configured to receive an awakening request. The data processing module is further configured to control the base station to switch from the dormant state to the work state wen the data interaction module receives the awakening request.

In the technical solution, the awakening request received by the base station can be the request sent by the terminal. For example, when the terminal needs data access service, voice call service, and other service, the terminal sends the awakening request, or when the network informs the terminal via the cell where the terminal resides, after determination, the terminal sends the awakening request to the dormant base station. When the base station receives the awakening request, the base station switches from the dormant state to the work state, which can make sure that when the terminal needs the base station to provide the data and/or voice service, the terminal can awaken the dormant base station in time, thereby ensuring real-time communication of the terminal and enhancing work performance of the base station.

In the technical solution, preferably, the data processing module controls the base station to switch from the dormant state to the work state once the data interaction module receives the awakening request, or the data processing module controls the base station to switch from the dormant state to the work state when the data interaction module receives a number of awakening requests from a number of terminals within a preset time interval. And/or the base station further includes an interference determining module configured to determine whether or not the base station can bring interference for other base stations. Wherein, the data processing module controls the base station to switch from the dormant state to the work state when the interference determining module determines that the base station will not bring interference for other base stations.

In the technical solution, when the base station receives the awakening request, the base station switches from the dormant state to the work state, so as to make sure that the terminal can communicate with others well. Preferably, when the terminal sends the awakening request, the terminal may send the awakening request to a number of base stations at the same time. To avoid awakening a number of base stations and avoid mutual interference, thus only when the base station receives a number of awakening requests from a number of terminals within the preset time interval, the base station switches from the dormant state to the work state, which can make sure that there are enough service requests after the base station is awakened. Also, as the number of awakened base stations is reduced, mutual interference among a number of base stations can be avoided, and power consumption of the base station is also reduced. Furthermore, when the base station receives the awakening request and determines that the base station cannot bring interference for other base stations, the base station switches from the dormant state to the work state, which can enhance work performance of the base station.

In the technical solution, preferably, the interference determining module determines whether or not the base station can bring interference for one other base station according to real time state information of a designated base station obtained by the data interaction module, and/or according to a characteristic parameter of signals from the designated base station obtained by the data interaction module. Wherein, when the base station is in the dormant state, and/or when the value of the characteristic parameter is less than or equals to a preset parameter threshold, the interference determining module determines that the base station cannot bring interference for the designated base station.

In the technical solution, the base station determines whether or not the base station can bring interference for other stations, which may enable the base station to switch from the dormant state to the work state when the base station needs to be awakened and when it is determined that the base station cannot bring interference for other stations, thus to a greatest degree interference among base stations can be reduced. The obtained real time state information of the designated base station includes the obtained characteristic parameter of the designated base station when the designated base station is in the dormant or work state, and can be the characteristic parameter indicating signal intensity and signal to noise ratio of the designated base station, or one other characteristic parameter indicating signals of the designated base station.

In the above technical solution, preferably, the data processing module is further configured to generate an awakening notification message. The awakening notification message at least includes an identity of the base station and an identity of the sender sending the awakening request, and the awakening notification message indicates that the base station will switch from the dormant state to the work state according to the request from the sender. The data interaction module is further configured to broadcast the awakening notification message, and/or receive one or more awakening notification messages from one or more other base stations. Wherein, when the data interaction module sends the awakening notification message and does not receive a corresponding response message, the data processing module controls the base station to switch from the dormant state to the work state. When the data interaction module receives a response message, the data processing module negotiates with the sender sending the response message via the data interaction module to finally determine which base station needs to switch from the dormant state to the work state. If the data interaction module receives one awakening notification message from one other base station, the data interaction module returns the awakening notification message to the data processing module, so as to generate a corresponding response message or make no response.

In the technical solution, after the base station receives the awakening request, the base station generates and broadcasts the awakening notification message, which can be used to determine whether or not there are one or more other base stations which have received the same awakening request and are waiting for switching to the work state. After it is determined that there is no other base station which is waiting for switching to the work state, the base station switches from the dormant state to the work state. When it is determined that there is one or more other base stations which have received the same awakening request and are waiting for switching to the work state, by means of negotiation among the base stations, which base station needs to switch from the dormant state to the work state can be determined, which reduces the number of awakened base stations, reduces interference among base stations, thus an optimal technical solution for awakening base stations can be realized. Specifically, when the base stations negotiate with each other, the base station which can provide optimal signal quality for the terminal sending the awakening request may be selected, and/or the base station the number of the awakening requests received by which is greatest can be selected. The base stations can negotiate with each other via return links or air interface information.

In the technical solution, preferably, the data processing module is further configured to parse the awakening request to obtain information of all target base stations. When the awakening request is further sent to one or more other base stations, the data processing module directly negotiates with the one or more other base stations via the data interaction module to determine which base station needs to switch from the dormant state to the work state.

In the technical solution, when the base station receives the awakening request from the terminal, the base station does not know whether or not there is one or more other base stations which have received the same awakening request, and also does not know which base station receives the awakening request. Therefore, by embedding identities of the other base stations which have received the awakening request into the awakening request, the base stations can directly negotiate with each other, which can make negotiation be meaningful and reduce delay caused by negotiation.

In the above technical solution, preferably, the data interaction module obtains the awakening request from a designated time-frequency resource. The awakening request includes a designated preamble sequence.

In the technical solution, the base station obtains the awakening request from the designated time-frequency resource, and the awakening request includes the designated preamble sequence, which can enable the terminal to precisely determine which base station needs to be awakened, thereby avoiding awakening a number of base stations and accordingly avoiding mutual interference. There may be a number of base stations using a same time-frequency resource, and preamble sequences of the base stations using different time-frequency resource may be the same. Therefore, for the reason of precisely determining which base station needs to be awakened by the terminal, the base station can be set to receive the awakening request from the designated time-frequency resource, and the base station needed to be awakened can be precisely determined according to the preamble sequence of the awakening request. Certainly, those skilled in the art should understand that in communication technology preamble sequence, pilot information, reference symbols are just different descriptions for a same concept, and they are the same and equivalent in essence.

In the technical solution, preferably, the data interaction module sends an available time-frequency resource and an available set of preamble sequences of the base station before the data processing module controls the base station to switch from the work state to the dormant state.

In the technical solution, the base station can be uniquely identified by the time-frequency resource and the available set of preamble sequences of the base station. The base station sends the available time-frequency resource and the available set of preamble sequences of the base station before the base station switches from the work state to the dormant state, which can enable other base stations and the terminal to determine which base station has entered the dormant state according to the received time-frequency resource and the received set of preamble sequences. When the terminal needs to awake a designated base station, the terminal only needs to send the awakening request including an available preamble sequence of the designated base station via the time-frequency resource of the designated base station, and the terminal can awaken the designated base station precisely. While other base stations can determine which base station has entered the dormant state according to the received time-frequency resource and the set of preamble sequences, thus the other base stations can determine that the other base stations cannot bring interference for the base station which has entered the dormant state.

In the technical solution, preferably, the data interaction module sends the pilot information including the available set of preamble sequences of the base station when the base station is in the dormant state.

In the technical solution, the terminal sends the awakening request via the designated time-frequency resource. The base station sends the available set of preamble sequences when in the dormant state, thus a number of base stations using a same time-frequency resource can be distinguished from each other according to available preamble sequences (set of preamble sequences), which can enable the terminal to only awake a designated base station via a selection of the time-frequency resource and the preamble sequence when the terminal needs to awake a base station, thereby avoiding awakening too many base stations (for example, all the base stations using a same time-frequency resource) and accordingly avoiding mutual interference among base stations.

The present invention further provides a cell interference coordination method which includes the terminal receiving pilot information from a base station which is in a dormant state, and the terminal generating an awakening request according to the pilot information and sending the awakening request to the base station. The awakening request is used to request the base station to switch from the dormant state to a work state.

In the technical solution, the base station which is in the dormant state can still send the pilot information, thereby enabling the terminal to generate the awakening request according to the pilot information received from the base station. Thus, when the terminal needs to obtain data and/or voice service from the base station, the terminal can awaken a designated base station which is in the dormant state, thereby avoiding simultaneously awakening a number of base stations by the terminal and accordingly avoiding mutual interference among a number of base stations.

In the technical solution, preferably, the method further includes the terminal generating the awakening request automatically, or generating the awakening request according to a received triggering request. Wherein, a wireless mobile communication network sends the triggering request to the terminal via the cell where the terminal resides.

In the technical solution, the states of the terminal include an active state and an idle state. When the terminal is in the active state, the terminal needs to obtain the data and/or voice service from the base station, thus the terminal can automatically generate the awakening request (generated in response to user's operation or an application program in the terminal generates the awakening request according to needs) to awaken the dormant base station. When the terminal is in the idle state, if the triggering request from the cell where the terminal resides is received (e.g., network switch demand based on load balance), the terminal can generate the corresponding awakening request to awaken the base station which is in the dormant state.

In the above technical solution, preferably, the method further includes the terminal measuring the received pilot information. Wherein, when the measurement result indicates that the value of the characteristic parameter of the pilot information is better than a preset parameter threshold, the terminal sends the awakening request to the corresponding base station. Or the terminal selects specified quantity of optimal pilot information according to the value of the characteristic parameter of each pilot information which is indicated by the measurement result, and sends the awakening request to the corresponding base stations. Or from the pilot information the value of the characteristic parameter of which is better than the preset parameter threshold, the terminal selects specified quantity of optimal pilot information, and sends the awakening request to the corresponding base stations.

In the technical solution, the terminal can measure the characteristic parameter of the base station according to the pilot information sent by the base station, for example reference signal receiving power (RSRP) in a protocol specification and/or reference signal receiving quality (RSRQ). The terminal can send the awakening request to the base station the value of the characteristic parameter of the pilot information sent by which is better than the preset parameter threshold, which can ensure that when the base station is awakened, good communication quality can be obtained. The terminal can send the awakening request to the base stations corresponding to specified quantity of pilot information according to the value of the characteristic parameter. The terminal can select specified quantity of pilot information from the pilot information the value of which characteristic parameter is better than the preset parameter threshold, and sends the awakening request to the corresponding base stations. If the terminal sends the awakening request to a number of base stations at the same time, when the plurality of base stations receive the awakening request, the base stations can negotiate with each other to finally determine which base station needs to be awakened, thereby ensuring that the number of the awakened base station is least, and accordingly avoiding interference among a number of base stations. The awakening request can be a random access channel (RACH), a sounding reference signal (SRS), or other similar request information.

In the above technical solution, preferably, the method further includes the terminal obtaining an available time-frequency resource and an available set of preamble sequences of the base station from the cell where the terminal resides, generating the awakening request including the specified preamble sequence, and sending the awakening request via the available time-frequency resource.

In the technical solution, the base station can be uniquely identified by the time-frequency resource and the available set of preamble sequences of the base station. The terminal sends the awakening request including the available set of preamble sequences of the designated base station via the available time-frequency resource of the designated base station, which can enable the terminal to precisely determine which base station needs to be awakened, thereby avoiding awakening a number of base stations and avoiding mutual interference. Certainly, those skilled in the art should understand that in communication technology preamble sequence, pilot information, reference symbols are just different descriptions for a same concept, and they are the same and equivalent in essence.

In the technical solution, preferably, the method further includes the terminal parsing the pilot information received from the base station to obtain the available set of preamble sequences of the base station.

In the technical solution, when the base station is in the dormant state, the pilot information sent by the base station includes the available set of preamble sequences, thus the base station can be uniquely identified by the designated time-frequency resource, which enables the terminal to only awaken the designated base station using a same time-frequency resource according to the parsed set of preamble sequences when the terminal needs to awaken a base station, thereby avoiding awakening too many base stations (for example, all the base stations using a same time-frequency resource) and accordingly avoiding mutual interference among base stations.

In the above technical solution, preferably, the method further includes the terminal obtaining the pilot information from the base station, obtaining the identity of the base station from the pilot information, and finding the available set of preamble sequences corresponding to the identity of the base station according to a preset table. Wherein, at least the identity of the base station and the available set of preamble sequences of the base station are stored in the preset table in a related manner.

In the technical solution, the identity of the base station can be a physical cell ID (PCI). In the preset table the PCI of each base station and the available set of preamble sequences of the base station are stored in a related manner, which can enable the terminal to directly find the corresponding available set of preamble sequences according to the identity of the base station included in the received pilot information, thus there is no need to query other base stations. Wherein, in the preset table, only one or only some base stations are recorded to increase query efficiency of the terminal. In the preset table, all the base stations can be recorded to increase the probability of that the terminal can successfully find the available set of preamble sequences.

According to another aspect of the present invention, the present invention further provides a terminal which includes a data interaction module configured to receive pilot information from a base station which is in a dormant state and send an awakening request generated by a data processing module, and the data processing module configured to generate an awakening request according to the pilot information. The awakening request is used to request the base station to switch from the dormant state to a work state.

In the technical solution, the base station which is in the dormant state can still send the pilot information, thereby enabling the terminal to generate the awakening request according to the pilot information received from the base station. Thus, when the terminal needs to obtain data and/or voice service from the base station, the terminal can awaken a designated base station which is in the dormant state, thereby avoiding simultaneously awakening a number of base stations by the terminal and accordingly avoiding mutual interference among a number of base stations.

In the technical solution, preferably, the data processing module generates the awakening request automatically, or the data processing module generates the awakening request according to a triggering request received by the data interaction module. Wherein, a wireless mobile communication network sends the triggering request to the terminal via the cell where the terminal resides.

In the technical solution, the states of the terminal include an active state and an idle state. When the terminal is in the active state, the terminal needs to obtain the data and/or voice service from the base station, thus the terminal can automatically generate the awakening request (generated in response to user's operation or an application program in the terminal generates the awakening request according to needs) to awaken the dormant base station. When the terminal is in the idle state, if the triggering request from the cell where the terminal resides is received (e.g., network switch demand based on load balance), the terminal can generate the corresponding awakening request to awaken the base station which is in the dormant state.

In the above technical solution, preferably, the data processing module further measures the received pilot information. Wherein, when the measurement result indicates that the value of the characteristic parameter of the pilot information is better than a preset parameter threshold, the data interaction module sends the awakening request to the corresponding base station. Or the data processing module selects specified quantity of optimal pilot information according to the value of the characteristic parameter of each pilot information which is indicated by the measurement result, and the data interaction module sends the awakening request to the corresponding base stations. Or from the pilot information the value of the characteristic parameter of which is better than the preset parameter threshold, the data processing module selects specified quantity of optimal pilot information, and the data interaction module sends the awakening request to the corresponding base stations.

In the technical solution, the terminal can measure the characteristic parameter of the base station according to the pilot information sent by the base station, for example reference signal receiving power (RSRP) in a protocol specification and/or reference signal receiving quality (RSRQ). The terminal can send the awakening request to the base station the value of the characteristic parameter of the pilot information sent by which is better than the preset parameter threshold, which can ensure that when the base station is awakened, good communication quality can be obtained. The terminal can send the awakening request to the base stations corresponding to specified quantity of pilot information according to the value of the characteristic parameter. The terminal can select specified quantity of pilot information from the pilot information the value of which characteristic parameter is better than the preset parameter threshold, and sends the awakening request to the corresponding base stations. If the terminal sends the awakening request to a number of base stations at the same time, when the plurality of base stations receive the awakening request, the base stations can negotiate with each other to finally determine which base station needs to be awakened, thereby ensuring that the number of the awakened base station is least, and accordingly avoiding interference among a number of base stations. The awakening request can be a random access channel (RACH), a sounding reference signal (SRS), or other similar request information.

In the above technical solution, preferably, the data interaction module is further configured to obtain an available time-frequency resource and an available set of preamble sequences of the base station from the cell where the terminal resides. The data processing module is further configured to generate the awakening request including the specified preamble sequence, and the data interaction module sends the awakening request via the available time-frequency resource.

In the technical solution, the base station can be uniquely identified by the time-frequency resource and the available set of preamble sequences of the base station. The terminal sends the awakening request including the available set of preamble sequences of the designated base station via the available time-frequency resource of the designated base station, which can enable the terminal to precisely determine which base station needs to be awakened, thereby avoiding awakening a number of base stations and avoiding mutual interference. Certainly, those skilled in the art should understand that in communication technology preamble sequence, pilot information, reference symbols are just different descriptions for a same concept, and they are the same and equivalent in essence.

In the technical solution, preferably, the data processing module is further configured to parse the pilot information which is received from the base station by the data interaction module to obtain the available set of preamble sequences of the base station.

In the technical solution, when the base station is in the dormant state, the pilot information sent by the base station includes the available set of preamble sequences, thus the base station can be uniquely identified by the designated time-frequency resource, which enables the terminal to only awaken a designated base station using a same time-frequency resource according to the parsed set of preamble sequences when the terminal needs to awaken a base station, thereby avoiding awakening too many base stations (for example, all the base stations using a same time-frequency resource) and accordingly avoiding mutual interference among base stations.

In the above technical solution, preferably, the data processing module is further configured to obtain the identity of the base station from the pilot information received from the base station by the data interaction module, and find the available set of preamble sequences corresponding to the identity of the base station according to a preset table. Wherein, at least the identity of the base station and the available set of preamble sequences of the base station are stored in the preset table in a related manner.

In the technical solution, the identity of the base station can be a physical cell ID (PCI). In the preset table the PCI of each base station and the available set of preamble sequences of the base station are stored in a related manner, which can enable the terminal to directly find the corresponding available set of preamble sequences according to the identity of the base station included in the received pilot information, thus there is no need to query other base stations. Wherein, in the preset table, only one or only some base stations are recorded to increase query efficiency of the terminal. In the preset table, all the base stations can be recorded to increase the probability of that the terminal can successfully find the available set of preamble sequences.

According to embodiments of the present invention, the present invention further provides a program product stored in a non-volatile machine readable medium to execute a cell interference coordination process. The program product includes machine executable instructions executed by the computer system to realize the following steps: a base station stopping sending other information other than pilot information after the base station switches to a dormant state from a work state.

According to embodiments of the present invention, the present invention further provides a non-volatile machine readable medium storing a program product for executing a cell interference coordination process. The program product includes machine executable instructions executed by the computer system to realize the following steps: a base station stopping sending other information other than pilot information after the base station switches to a dormant state from a work state.

According to embodiments of the present invention, the present invention further provides a machine-readable program configured to enable the machine to execute any of the cell interference coordination methods described in the above technical solutions.

According to embodiments of the present invention, the present invention further provides a storage medium storing a machine readable program. Wherein, the machine-readable program is configured to enable the machine to execute any of the cell interference coordination methods described in the above technical solutions.

By means of the above technical solution, the base station is enabled to send pilot information when in a dormant state, thereby avoiding bringing interference for other base stations, and also enabling a terminal to awaken the dormant base station according to the received pilot information as required.

DETAILED DESCRIPTION OF ILLUSTRATED EMBODIMENTS

To understand the above-mentioned purposes, features and advantages of the present disclosure more clearly, the present disclosure will be further described in detail below in combination with the accompanying drawings and the specific implementations. It should be noted that, the embodiments of the present application and the features in the embodiments may be combined with one another without conflicts.

Many specific details will be described below for sufficiently understanding the present disclosure. However, the present disclosure may also be implemented by adopting other manners different from those described herein. Accordingly, the protection scope of the present invention is not limited by the specific embodiments disclosed below.

Figure 1:
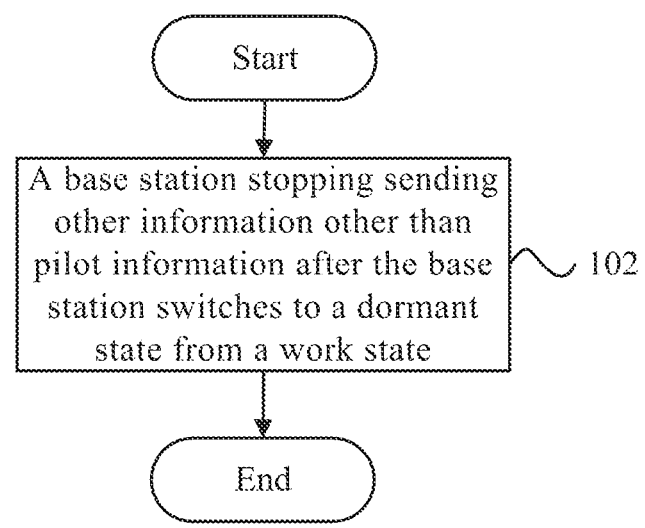
FIG. 1 is a flow chart of a cell interference coordination method in accordance with an exemplary embodiment of the present invention.

FIG. 1 is a flow chart of a cell interference coordination method in accordance with an exemplary embodiment of the present invention.

As shown in FIG. 1, a cell interference coordination method in accordance with an exemplary embodiment of the present invention includes step 102, a base station stopping sending other information other than pilot information after the base station switches to a dormant state from a work state.

In the technical solution, after the base station switches to the dormant state from the work state, the base station stops sending other information other than the pilot information, which can eliminate interference for other base stations caused by the above-mentioned other information which is sent by the base station, and for the base station data and/or voice service is temporarily not needed. Also a terminal can find the dormant base station according to the pilot information sent by the base station, which can ensure that when the terminal needs the data transmission and/or voice service, the terminal can awaken the base station in time.

Specifically, the pilot information can be a cell-specific reference signal (CRS), and can be also a part of information of the CRS which may not bring interference or bring less interference for other base stations. The pilot information can be also other pilot information supported by a protocol, for example, a channel state information reference signal (CSI-RS), or a part of the information of the CSI-RS, and it should make sure that the value of interference brought by the part of the information of the CSI-RS will not exceed a certain interference threshold.

In the technical solution, preferably, the method further includes the base station switching to the dormant state from the work state when the base station determines that the base station satisfies a preset state switch condition. Wherein, the state switch condition includes that in the cell there is no terminal in an active state and no terminal in an idle state, or in the cell there is no terminal in the active state, or in the cell there is only one or more terminals in the idle state and there is one or more other cells where the one or more terminals in the idle state can reside, or in the cell there is one or more terminals in the active state and one or more terminals in the idle state and there is one or more other cells where the one or more terminals in the active state and the one or more terminals in the idle state can reside.

In the technical solution, the states of the terminals in the cell corresponding to the base station are analyzed, which can ensure that sleeping of the base station will bring least possible influence for the terminals, thereby ensuring that users can obtain good usage experience.

Under the first condition, when there is no terminal in the cell corresponding to the base station, the base station directly enters the dormant state. Under the second condition, for the reason that the terminal in the active state needs to receive data and/or voice service from the base station, while the terminal in the idle state only needs to reside in the cell to receive corresponding base station information, therefore, when it make sure that in the cell there is no terminal in the active state, interference for normal communication of the terminal can be reduced to be least. Under the third condition, when in the cell there is no terminal in the active state, for the terminal in the idle state, when there is one other cell available for the terminal to reside, interference for the terminal can be reduced to be least. Under the fourth condition, no matter whether in the cell there is one terminal in the active state or there is one terminal in the idle state, only when there is one other cell available for the terminal to reside, to a great degree interference for normal communication of the terminal can be reduced.

Specifically, the base station can determine whether or not there is one or more other cells available for a terminal to reside in various ways. For example, when the base station determines that around the terminal there is a cell having better signal (e.g., signal power is greater than or equals to a preset power threshold, or signal quality is greater than or equals to a preset quality threshold) according to a measurement report uploaded by the terminal, the base station determines that the terminal can reside in the cell. Or the base station can obtain the position of the terminal, thus when the base station determines that there is a cell near the terminal, the base station determines that the terminal can reside in the cell. Or other ways can be adopted.

In the technical solution, preferably, the method further includes the base station sending the pilot information via a part of antenna ports.

In the technical solution, in the dormant state, the base station can send the pilot information normally. As the pilot information can cause great interference, when in the dormant state the base station sends the pilot information only via a part of the antenna ports, it can make sure that the terminal can find the dormant base station and interference for other unsleeping cells brought by the base station can be reduced. Specifically, the sequence numbers of the antenna ports which can be used to send GRS pilot information are respectively 0, 1, 2, and 3, and then any one, any two, or any three of the antenna ports can be selected to send the GRS pilot information. Comparing to that all the antenna ports are used to send the pilot information, apparently, the above solution can effectively reduce interference for other base stations.

In the technical solution, preferably, when the pilot information is the cell-specific reference signal, the antenna port which sequence number is 2 or 3 can be selected, or the antenna ports which sequence numbers are respectively 2 and 3 can be selected.

In the technical solution, when the base station decides to select a part of the antenna ports to send the pilot information, the base station can preferably select the antenna port the pilot information sent by which may not bring interference or bring least interference for other unsleeping cells, to reduce interference for other unsleeping cells. When the pilot information is the cell-specific reference signal, selecting the antenna port which sequence number is 2 or 3, or selecting the antenna ports which sequence numbers are respectively 2 and 3 can effectively reduce interference for other unsleeping cells which is caused by the pilot information, thereby increasing communication quality in the other unsleeping cells.

Figure 2A:
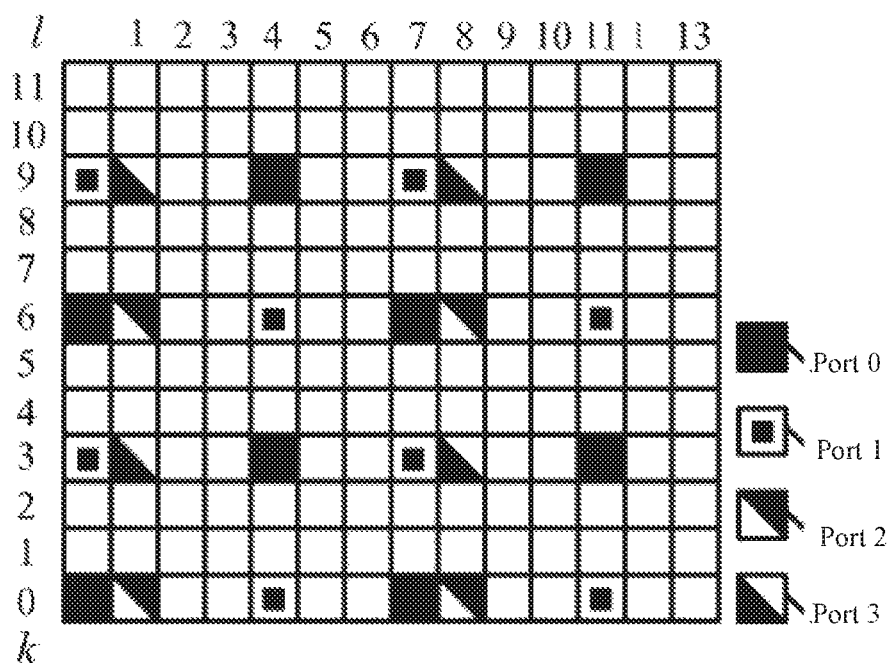
FIG. 2A is a schematic view of a structure of a resource block in a conventional cyclic prefix system.
Figure 2B:
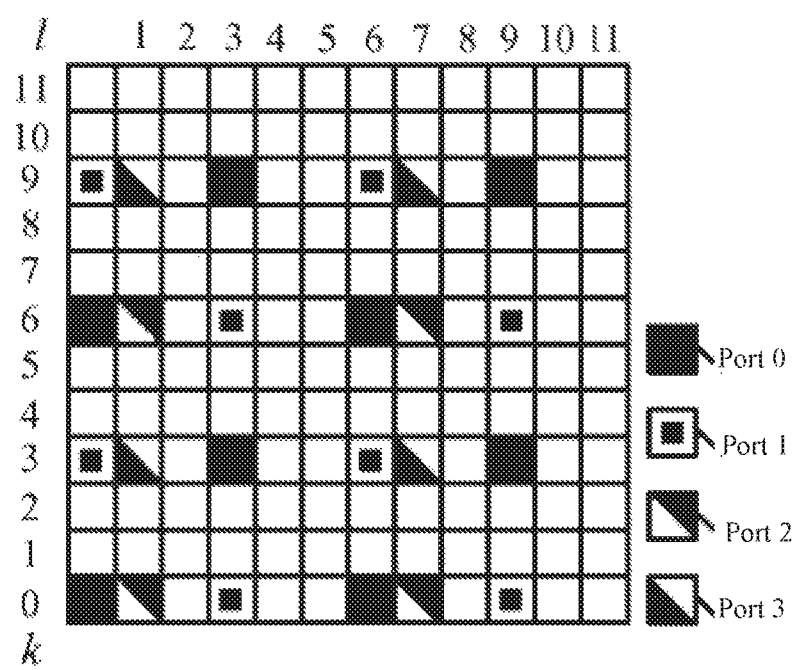
FIG. 2B is a schematic view of a structure of a resource block in an extended cyclic prefix system.

Specifically, FIG. 2A shows a schematic view of a structure of a resource block in a conventional cyclic prefix system in accordance with an exemplary embodiment of the present invention, and FIG. 2B shows a schematic view of a structure of a resource block in an extended cyclic prefix system in accordance with an exemplary embodiment of the present invention. In the figures, position information of the antenna ports used for sending the CRS (port 0, port 1, port 2, and port 3 in the figures) are specifically shown. Wherein, when the antenna ports 2 and 3 or when the antenna port 2 or 3 is used to send the CRS, interference for other base stations is relatively smaller, thus selecting the antenna port 2 or 3, or selecting the antenna ports 2 and 3 can effectively reduce interference for other unsleeping cells which is caused by the CRS.

In the technical solution, preferably, the method further includes the base station receiving an awakening request, and switching from the dormant state to the work state.

In the terminal, the awakening request received by the base station can be the request sent by the terminal. For example, when the terminal needs data access service, voice call service, and other services, the terminal sends the awakening request, or when the network informs the terminal via the cell where the terminal resides, after determination, the terminal sends the awakening request to the dormant base station. When the base station receives the awakening request, the base station switches from the dormant state to the work state, which can make sure that when the terminal needs the base station to provide the data and/or voice service, the terminal can awaken the dormant base station in time, thereby ensuring real-time communication of the terminal and enhancing work performance of the base station.

In the technical solution, preferably, the method further includes the base station switching from the dormant state to the work state once the base station receives the awakening request, or switching from the dormant state to the work state when the base station receives a number of awakening requests from a number of terminals within a preset time interval, or switching from the dormant state to the work state when the base station determines that the base station cannot bring interference for other base stations.

In the technical solution, when the base station receives the awakening request, the base station switches from the dormant state to the work state, so as to make sure that the terminal can communicate with others well. Preferably, when the terminal sends the awakening request, the terminal may send the awakening request to a number of base stations at the same time. To avoid awakening a number of base stations and avoid mutual interference, thus when the base station receives a number of awakening requests from a number of terminals within the preset time interval, the base station switches from the dormant state to the work state, which can make sure that there are enough service requests after the base station is awakened. Also, as the number of awakened based stations is reduced, mutual interference among a number of base stations can be avoided, and power consumption of the base station is also reduced. Furthermore, when the base station receives the awakening request and determines that the base station cannot bring interference for other base stations, the base station switches from the dormant state to the work state, which can enhance work performance of the base station.

In the technical solution, preferably, the process of the base station determining whether or not the base station can bring interference for other base stations includes the following. The base station obtains real time state information of a designated base station, and/or obtain a characteristic parameter of signals from the designated base station. Wherein, when the designated base station is in the dormant state, and/or when the value of the characteristic parameter is less than or equals to a preset parameter threshold, it is determined that the base station cannot bring interference for the designated base station.

In the technical solution, the base station determines whether or not the base station can bring interference for other stations, which may enable the base station to switch from the dormant state to the work state when the base station needs to be awakened and when it is determined that the base station cannot bring interference for other base stations, thus to a greatest degree interference among base stations can be reduced. The obtained real time state information of the designated base station includes the characteristic parameter of the designated base station when the designated base station is in the dormant or work state, and can be the characteristic parameter indicating signal intensity and signal to noise ratio of the designated base station, or one other characteristic parameter indicating signals of the designated base station.

Additionally, the base station can adopt other ways to determine whether or not to execute state switch. For example, when other base stations within a certain range of the base station are all in the dormant state, the base station determines that the base station cannot bring interference for other base stations, and the base station can switch to the work state. When within a certain range of the base station there is one or more base stations in the work state, or there are a great number of base stations in the work state (the number is greater than or equals to a preset threshold), it is determined that state switch of the base station can affect other base stations, and the base station cannot switch to the work state.

In the above technical solution, preferably, after the base station receives the awakening request, the method further includes the base station generating and broadcasting an awakening notification message, and/or receiving one or more awakening notification messages from one or more other base stations. The awakening notification message generated by the base station at least include an identity of the base station and an identity of the sender sending the awakening request, and the awakening notification message indicates that the base station will switch from the dormant state to the work state according to the awakening request from the sender. Wherein, when the base station sends the awakening notification message and does not receive a corresponding response message, the base station switches from the dormant state to the work state. When the base station receives a response message, the base station negotiates with the sender sending the response message to finally determine which base station needs to switch from the dormant state to the work state. When the base station receives one awakening notification messages from one other base station, the base station returns a corresponding response message or makes no response.

In the technical solution, after the base station receives the awakening request, the base station generates and broadcasts the awakening notification message, which can be used to determine whether or not there are one or more other base stations which have received the same awakening request and are waiting for switching to the work state. After it is determined that there is no other base station which is waiting for switching to the work state, the base station switches from the dormant state to the work state. When it is determined that there are one or more other base stations which have received the same awakening request and are waiting for switching to the work state, by negotiation of the base stations, which base station needs to switch from the dormant state to the work state can be determined, which reduces the number of awakened base stations, reduces interference among base stations, thus an optimal technical solution for awakening base stations can be realized. Specifically, when the base stations negotiate with each other, the base station which can provide optimal signal quality for the terminal sending the awakening request may be selected, and/or the base station the number of the awakening requests received by which is greatest can be selected. The base stations can negotiate with each other via return links or air interface information.

In the technical solution, preferably, the awakening request includes information of all target base stations. When the awakening request is further sent to one or more other base stations, the cell interference coordination method further includes the base station directly negotiating with the one or more other base stations to finally determine which base station needs to switch from the dormant state to the work state.

In the technical solution, when the base station receives the awakening request from the terminal, the base station does not know whether or not there is one or more other base stations which have received the same awakening request, and also does not know which base station has received the awakening request. Therefore, by embedding identities of the other base stations which have received the awakening request into the awakening request, the base stations can directly negotiate with each other, which can make negotiation be meaningful and reduce delay caused by negotiation.

Certainly, the awakening request can further include other information of the above base station. For example, the terminal can measure performance indicators of the base station according to the pilot information of the base station (for example, reference signal receiving power (RSRP) in a protocol specification and/or reference signal receiving quality (RSRQ)), and send the performance indicators of a plurality of base stations to the plurality of base stations with the awakening request, which can enable the plurality of base stations to finally determine which base station needs to switch from the dormant state to the work state according to the performance indicators of the plurality of base stations embedded in the awakening request, thereby ensuring that the awakened base station can have good work performance.

In the above technical solution, preferably, the method further includes the base station obtaining the awakening request from a designated time-frequency resource. The awakening request includes a designated preamble sequence.

In the technical solution, the base station obtains the awakening request from the designated time-frequency resource, and the awakening request includes the designated preamble sequence, which can enable the terminal to precisely determine which base station needs to be awakened, thereby avoiding awakening a number of base stations and accordingly avoiding mutual interference. In a same time-frequency resource there may be a number of base stations, and preamble sequences of the base stations in different time-frequency resource may be the same. Therefore, for the reason that the terminal can precisely determine which base station needs to be awakened, the base station can be set to receive the awakening request from the designated time-frequency resource, and the base station needed to be awaken can be precisely determined according to the preamble sequence of the awakening request. Certainly, those skilled in the art should understand that in communication technology preamble sequence, pilot information, reference symbols are just different descriptions for a same concept, and they are the same and equivalent in essence.

In the technical solution, preferably, the method further includes the base station sending an available time-frequency resource and an available set of preamble sequences of the base station before the base station switches from the work state to the dormant state.

In the technical solution, the base station can be uniquely identified by the time-frequency resource and the available set of preamble sequences of the base station. The base station sends the available time-frequency resource and the available set of preamble sequences of the base station before the base station switches from the work state to the dormant state, which can enable other stations and the terminal to determine which base station has entered the dormant state according to the received time-frequency resource and the received available set of preamble sequences. When the terminal needs to awake a designated base station, the terminal only needs to send the awakening request including the available preamble sequence of the designated base station via the time-frequency resource of the designated base station, and the terminal can precisely awaken the designated base station. While other base stations can determine which station has entered the dormant state according to the received time-frequency resource and the set of preamble sequences, thus the other base station can determine that the other base station cannot bring interference for the base station which has entered the dormant state.

In the technical solution, preferably, the pilot information sent by the dormant base station includes an available set of preamble sequences.

In the technical solution, the terminal sends the awakening request via the designated time-frequency resource. The base station sends the available set of preamble sequences when in the dormant state, thus a number of base stations using a same time-frequency resource can be distinguished from each other according to available preamble sequences (set of preamble sequences), which can enable the terminal to only awake a designated base station via a selection of the time-frequency resource and the preamble sequence when the terminal needs to awake a base station, thereby avoiding awakening too many base stations (for example, all the base stations using a same time-frequency resource) and accordingly avoiding mutual interference among base stations.

Figure 3:
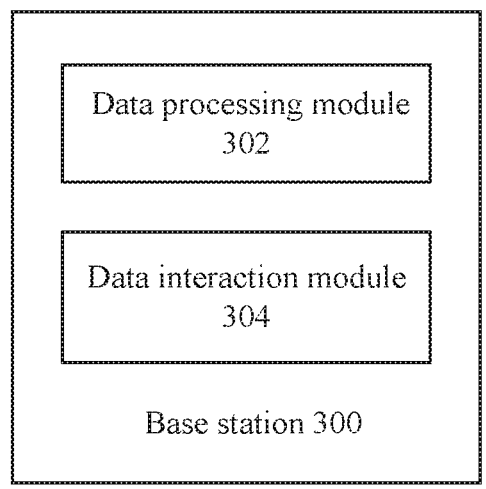
FIG. 3 is a block diagram of a base station in accordance with an exemplary embodiment of the present invention.

FIG. 3 is a block diagram of a base station in accordance with an exemplary embodiment of the present invention.

As shown in FIG. 3, a base station 300 in accordance with an exemplary embodiment of the present invention includes a data processing module 302 configured to control the base station 300 to switch from a work state to a dormant state, and a data interaction module 304 configured to stop sending other information other than pilot information when the base station 300 is in the dormant state.

In the technical solution, after the base station 300 switches to the dormant state from the work state, the base station 300 stops sending other information other than the pilot information, which can eliminate interference for other base stations 300 caused by the above-mentioned other information which is sent by the base station 300, and for the base station 300 data and/or voice service is temporarily not needed. Also a terminal can find the dormant base station 300 according to the pilot information sent by the base station 300, which can ensure that when the terminal needs data transmission and/or voice service, the terminal can awaken the base station 300 in time.

Specifically, the pilot information can be a cell-specific reference signal (CRS), and can be also a part of information of the CRS which may not bring interference or bring less interference for other stations. The pilot information can be also other pilot information supported by a protocol, for example, a channel state information reference signal (CSI-RS), or a part of the information of the CSI-RS, and it should make sure that interference brought by the part of the information of the CSI-RS cannot exceed a certain interference threshold.

In the technical solution, preferably, the data processing module 302 is further configured to determine whether or not the base station 300 matches a preset state switch condition, and control the base station 300 to switch from the work state to the dormant state when the determination result is yes. Wherein, the state switch condition includes that in the cell there is no terminal in an active state and no terminal in an idle state, or in the cell there is no terminal in the active state, or in the cell there is only one or more terminals in the idle state and there is one or more other cells where the one or more terminals in the idle state can reside, or in the cell there is one or more terminals in the active state and one or more terminals in the idle state and there is one or more other cells where the one or more terminals in the active state and the one or more terminals in the idle state can reside.

In the technical solution, the states of the terminals in the cell corresponding to the base station 300 are analyzed, which can ensure that sleeping of the base station 300 brings least possible influence for the terminals, thereby ensuring that users can obtain good usage experience.

Under the first condition, when there is no terminal in the cell corresponding to the base station 300, the base station 300 directly enters the dormant state. Under the second condition, for the reason that the terminal in the active state needs to receive data and/or voice service from the base station 300, while the terminal in the idle state only needs to reside in the cell to receive corresponding base station information, therefore, when it make sure that in the cell there is no terminal in the active state, interference for normal communication of the terminal can be reduced to be least. Under the third condition, when in the cell there is no terminal in the active state, for the terminal in the idle state, when there is one other cell available for the terminal to reside, interference for the terminal can be reduced to be least. Under the fourth condition, no matter whether in the cell there is one terminal in the active state or there is one terminal in the idle state, only when there is one other cell available for the terminal to reside, to a great degree interference for normal communication of the terminal can be reduced.

Specifically, the base station 300 can determine whether or not there is one other cell available for a terminal to reside in various ways. For example, when the base station 300 determines that around the terminal there is a cell having better signal (e.g., signal power is greater than or equals to a preset power threshold, or signal quality is greater than or equals to a preset quality threshold) according to a measurement report uploaded by the terminal, the base station 300 determines that the terminal can reside in the cell. Or the base station 300 can obtain the position of the terminal, thus when the base station 300 determines that there is a cell near the terminal, the base station 300 determines that the terminal can reside in the cell. Or other ways can be adopted.

In the technical solution, preferably, the data interaction module 304 sends the pilot information only via a part of antenna ports.

In the technical solution, in the dormant state, the base station 300 can send the pilot information normally. As the pilot information can cause greater interference, when in the dormant state the base station 300 sends the pilot information only via a part of the antenna ports, it can make sure that the terminal can find the dormant base station 300 and interference for other unsleeping cells brought by the base station 300 can be reduced. Specifically, the sequence numbers of the antenna ports which can be used to send GRS pilot information are respectively 0, 1, 2, and 3, and then any one, any two, or any three of the antenna ports can be selected to send the GRS pilot information. Comparing to that all the antenna ports are used to send the pilot information, apparently, the above solution can effectively reduce interference for other base stations.

In the technical solution, preferably, when the pilot information is the cell-specific reference signal, the antenna port which sequence number is 2 or 3 can be selected, or the antenna ports which sequence numbers are respectively 2 and 3 can be selected.

In the technical solution, when the base station 300 decides to select a part of the antenna ports to send the pilot information, the base station 300 can preferably select the antenna port the pilot information sent by which may not bring interference or bring least interference for other unsleeping cells, to reduce interference for other unsleeping cells. When the pilot information is the cell-specific reference signal, selecting the antenna port which sequence number is 2 or 3, or selecting the antenna ports which sequence numbers are respectively 2 and 3 can effectively reduce interference for other unsleeping cells which is caused by the pilot information, thereby increasing communication quality of the other unsleeping cells.

In the technical solution, preferably, the data interaction module 304 is further configured to receive an awakening request. The data processing module 302 is further configured to control the base station 300 to switch from the dormant state to the work state wen the data interaction module 304 receives the awakening request.

In the technical solution, the awakening request received by the base station 300 can be the request sent by the terminal. For example, when the terminal needs data access service, voice call service, and other service, the terminal sends the awakening request, or when the network informs the terminal via the cell where the terminal resides, after determination, the terminal sends the awakening request to the dormant base station 300. When the base station 300 receives the awakening request, the base station 300 switches from the dormant state to the work state, which can make sure that when the terminal needs the base station 300 to provide the data and/or voice service, the terminal can awaken the dormant base station 300 in time, thereby ensuring real-time communication of the terminal and enhancing work performance of the base station 300.

In the technical solution, preferably, the data processing module 302 controls the base station 300 to switch from the dormant state to the work state once the data interaction module 304 receives the awakening request, or the data processing module 302 controls the base station 300 to switch from the dormant state to the work state when the data interaction module 304 receives a number of awakening requests from a number of terminals within a preset time interval. And/or the base station 300 further includes an interference determining module configured to determine whether or not the base station 300 can bring interference for other base stations 300. Wherein, the data processing module 302 controls the base station 300 to switch from the dormant state to the work state when the interference determining module determines that the base station 300 will not bring interference for other base stations 300.

In the technical solution, when the base station 300 receives the awakening request, the base station 300 switches from the dormant state to the work state, so as to make sure that the terminal can communicate with others well. Preferably, when the terminal sends the awakening request, the terminal may send the awakening request to a number of base stations at the same time. To avoid awakening a number of base stations 300 and avoid mutual interference, thus only when the base station 300 receives a number of awakening requests from a number of terminals within the preset time interval, the base station 300 switches from the dormant state to the work state, which can make sure that there are enough service requests after the base station 300 is awakened. Also, as the number of awakened base stations 300 is reduced, mutual interference among a number of base stations 300 can be avoided, and power consumption of the base station 300 is also reduced. Furthermore, when the base station 300 receives the awakening request and determines that the base station 300 cannot bring interference for other base stations 300, the base station 300 switches from the dormant state to the work state, which can enhance work performance of the base station 300.

In the technical solution, preferably, the interference determining module determines whether or not the base station 300 can bring interference for one other base station 300 according to real time state information of a designated base station 300 obtained by the data interaction module 304, and/or according to a characteristic parameter of signals from the designated base station 300 obtained by the data interaction module 304. Wherein, when the base station 300 is in the dormant state, and/or when the value of the characteristic parameter is less than or equals to a preset parameter threshold, the interference determining module determines that the base station 300 cannot bring interference for the designated base station.

In the technical solution, the base station 300 determines whether or not the base station 300 can bring interference for other stations, which may enable the base station 300 to switch from the dormant state to the work state when the base station 300 needs to be awakened and when it is determined that the base station 300 cannot bring interference for other stations, thus to a greatest degree interference among base stations 300 can be reduced. The obtained real time state information of the designated base station 300 includes the obtained characteristic parameter of the designated base station 300 when the designated base station 300 is in the dormant or work state, and can be the characteristic parameter indicating signal intensity and signal to noise ratio of the designated base station 300, or one other characteristic parameter indicating signals of the designated base station 300.

Additionally, the base station 300 can adopt other ways to determine whether or not to execute state switch. For example, when other base stations within a certain range of the base station 300 are all in the dormant state, the base station 300 determines that the base station 300 cannot bring interference for other base stations, and the base station 300 can switch to the work state. When within a certain range of the base station 300 there is one or more base stations in the work state, or there are a great number of base stations in the work state (the number is greater than or equals to a preset threshold), it is determined that state switch of the base station 300 can affect other base stations, and the base station 300 cannot switch to the work state.

In the above technical solution, preferably, the data processing module 302 is further configured to generate an awakening notification message. The awakening notification message at least includes an identity of the base station 300 and an identity of the sender sending the awakening request, and the awakening notification message indicates that the base station 300 will switch from the dormant state to the work state according to the request from the sender. The data interaction module 304 is further configured to broadcast the awakening notification message, and/or receive one or more awakening notification messages from one or more other base stations 300. Wherein, when the data interaction module 304 sends the awakening notification message and does not receive a corresponding response message, the data processing module 302 controls the base station 300 to switch from the dormant state to the work state. When the data interaction module 304 receives a response message, the data processing module 302 negotiates with the sender sending the response message via the data interaction module 304 to finally determine which base station 300 needs to switch from the dormant state to the work state. If the data interaction module 304 receives one awakening notification message from one other base station 300, the data interaction module 304 returns the awakening notification message to the data processing module 302, so as to generate a corresponding response message or make no response.

In the technical solution, after the base station 300 receives the awakening request, the base station 300 generates and broadcasts the awakening notification message, which can be used to determine whether or not there are one or more other base stations 300 which have received the same awakening request and are waiting for switching to the work state. After it is determined that there is no other base station 300 which is waiting for switching to the work state, the base station 300 switches from the dormant state to the work state. When it is determined that there is one or more other base stations 300 which have received the same awakening request and are waiting for switching to the work state, by means of negotiation among the base stations 300, which base station 300 needs to switch from the dormant state to the work state can be determined, which reduces the number of awakened base stations 300, reduces interference among base stations 300, thus an optimal technical solution for awakening base stations 300 can be realized. Specifically, when the base stations 300 negotiate with each other, the base station 300 which can provide optimal signal quality for the terminal sending the awakening request may be selected, and/or the base station 300 the number of the awakening requests received by which is greatest can be selected. The base stations 300 can negotiate with each other via return links or air interface information.

In the technical solution, preferably, the data processing module 302 is further configured to parse the awakening request to obtain information of all target base stations 300. When the awakening request is further sent to one or more other base stations 300, the data processing module 302 directly negotiates with the one or more other base stations 300 via the data interaction module 304 to determine which base station 300 needs to switch from the dormant state to the work state.

In the technical solution, when the base station 300 receives the awakening request from the terminal, the base station 300 does not know whether or not there is one or more other base stations which have received the same awakening request, and also does not know which base station receives the awakening request. Therefore, by embedding identities of the other base stations which have received the awakening request into the awakening request, the base stations can directly negotiate with each other, which can make negotiation be meaningful and reduce delay caused by negotiation.

Certainly, the awakening request can further include other information of the above base station. For example, the terminal can measure a performance indicator of the base station according to the pilot information of the base station (for example, reference signal receiving power (RSRP) in a protocol specification and/or reference signal receiving quality (RSRQ)), and send a plurality of performance indicators of a plurality of base stations to the plurality of base stations with the awakening request, which can enable the plurality of base stations to finally determine which base station needs to switch from the dormant state to the work state according to the performance indicators of the plurality of base stations embedded in the awakening request, thereby ensuring that the awakened base station can have good work performance.

In the above technical solution, preferably, the data interaction module 304 obtains the awakening request from a designated time-frequency resource. The awakening request includes a designated preamble sequence.

In the technical solution, the base station 300 obtains the awakening request from the designated time-frequency resource, and the awakening request includes the designated preamble sequence, which can enable the terminal to precisely determine which base station 300 needs to be awakened, thereby avoiding awakening a number of base stations and accordingly avoiding mutual interference. There may be a number of base stations 300 using a same time-frequency resource, and preamble sequences of the base stations 300 using different time-frequency resource may be the same. Therefore, for the reason of precisely determining which base station 300 needs to be awakened by the terminal, the base station 300 can be set to receive the awakening request from the designated time-frequency resource, and the base station 300 needed to be awakened can be precisely determined according to the preamble sequence of the awakening request. Certainly, those skilled in the art should understand that in communication technology preamble sequence, pilot information, reference symbols are just different descriptions for a same concept, and they are the same and equivalent in essence.

In the technical solution, preferably, the data interaction module 304 sends an available time-frequency resource and an available set of preamble sequences of the base station 300 before the data processing module 302 controls the base station 300 to switch from the work state to the dormant state.

In the technical solution, the base station 300 can be uniquely identified by the time-frequency resource and the available set of preamble sequences of the base station 300. The base station 300 sends the available time-frequency resource and the available set of preamble sequences of the base station 300 before the base station 300 switches from the work state to the dormant state, which can enable other base stations 300 and the terminal to determine which base station 300 has entered the dormant state according to the received time-frequency resource and the received set of preamble sequences. When the terminal needs to awake a designated base station 300, the terminal only needs to send the awakening request including an available preamble sequence of the designated base station 300 via the time-frequency resource of the designated base station 300, and the terminal can awaken the designated base station 300 precisely. While other base stations 300 can determine which base station 300 has entered the dormant state according to the received time-frequency resource and the set of preamble sequences, thus the other base stations 300 can determine that the other base stations 300 cannot bring interference for the base station 300 which has entered the dormant state.

In the technical solution, preferably, the data interaction module 304 sends the pilot information including the available set of preamble sequences of the base station 300 when the base station 300 is in the dormant state.

In the technical solution, the terminal sends the awakening request via the designated time-frequency resource. The base station 300 sends the available set of preamble sequences when in the dormant state, thus a number of base stations using a same time-frequency resource can be distinguished from each other according to available preamble sequences (set of preamble sequences), which can enable the terminal to only awake a designated base station via a selection of the time-frequency resource and the preamble sequence when the terminal needs to awake a base station, thereby avoiding awakening too many base stations (for example, all the base stations using a same time-frequency resource) and accordingly avoiding mutual interference among base stations.

Figure 4:
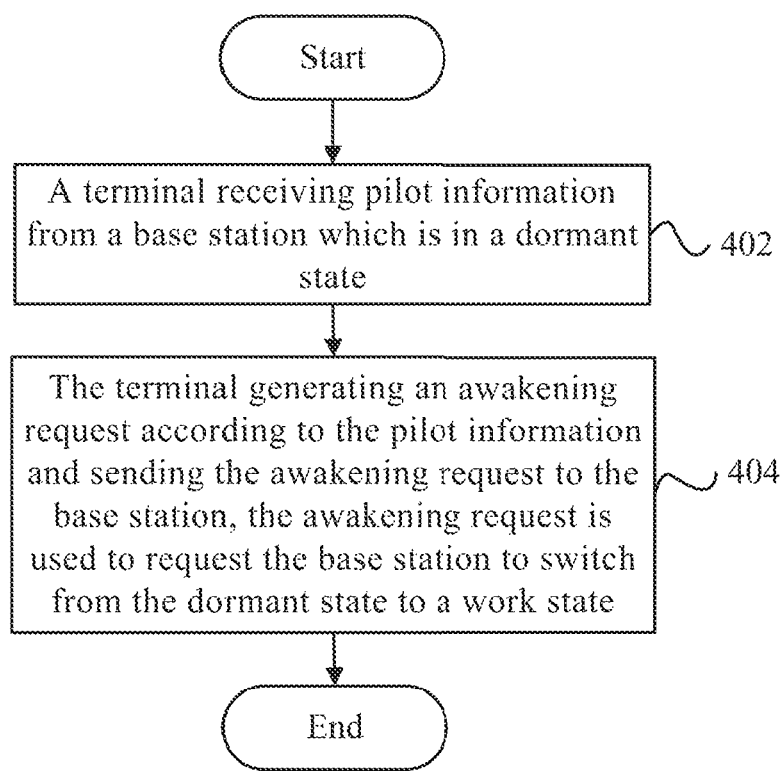
FIG. 4 is a flow chart of a cell interference coordination method in accordance with another embodiment of the present invention.

FIG. 4 is a flow chart of a cell interference coordination method in accordance with another embodiment of the present invention.

As shown in FIG. 4, a cell interference coordination method in accordance with another embodiment of the present invention includes step 402, the terminal receiving pilot information from a base station which is in a dormant state, and step 404, the terminal generating an awakening request according to the pilot information and sending the awakening request to the base station. The awakening request is used to request the base station to switch from the dormant state to a work state.

In the technical solution, the base station which is in the dormant state can still send the pilot information, thereby enabling the terminal to generate the awakening request according to the pilot information received from the base station. Thus, when the terminal needs to obtain data and/or voice service from the base station, the terminal can awaken a designated base station which is in the dormant state, thereby avoiding simultaneously awakening a number of base stations by the terminal and accordingly avoiding mutual interference among a number of base stations.

In the technical solution, preferably, the method further includes the terminal generating the awakening request automatically, or generating the awakening request according to a received triggering request. Wherein, a wireless mobile communication network sends the triggering request to the terminal via the cell where the terminal resides.

In the technical solution, the states of the terminal include an active state and an idle state. When the terminal is in the active state, the terminal needs to obtain the data and/or voice service from the base station, thus the terminal can automatically generate the awakening request (generated in response to user's operation or an application program in the terminal generates the awakening request according to needs) to awaken the dormant base station. When the terminal is in the idle state, if the triggering request from the cell where the terminal resides is received (e.g., network switch demand based on load balance), the terminal can generate the corresponding awakening request to awaken the base station which is in the dormant state.

In the above technical solution, preferably, the method further includes the terminal measuring the received pilot information. Wherein, when the measurement result indicates that the value of the characteristic parameter of the pilot information is better than a preset parameter threshold, the terminal sends the awakening request to the corresponding base station. Or the terminal selects specified quantity of optimal pilot information according to the value of the characteristic parameter of each pilot information which is indicated by the measurement result, and sends the awakening request to the corresponding base stations. Or from the pilot information the value of the characteristic parameter of which is better than the preset parameter threshold, the terminal selects specified quantity of optimal pilot information, and sends the awakening request to the corresponding base stations.

In the technical solution, the terminal can measure the characteristic parameter of the base station according to the pilot information sent by the base station, for example reference signal receiving power (RSRP) in a protocol specification and/or reference signal receiving quality (RSRQ). The terminal can send the awakening request to the base station the value of the characteristic parameter of the pilot information sent by which is better than the preset parameter threshold, which can ensure that when the base station is awakened, good communication quality can be obtained. The terminal can send the awakening request to the base stations corresponding to specified quantity of pilot information according to the value of the characteristic parameter. The terminal can select specified quantity of pilot information from the pilot information the value of which characteristic parameter is better than the preset parameter threshold, and sends the awakening request to the corresponding base stations. If the terminal sends the awakening request to a number of base stations at the same time, when the plurality of base stations receive the awakening request, the base stations can negotiate with each other to finally determine which base station needs to be awakened, thereby ensuring that the number of the awakened base station is least, and accordingly avoiding interference among a number of base stations. The awakening request can be a random access channel (RACH), a sounding reference signal (SRS), or other similar request information.

In the above technical solution, preferably, the method further includes the terminal obtaining an available time-frequency resource and an available set of preamble sequences of the base station from the cell where the terminal resides, generating the awakening request including the specified preamble sequence, and sending the awakening request via the available time-frequency resource.

In the technical solution, the base station can be uniquely identified by the time-frequency resource and the available set of preamble sequences of the base station. The terminal sends the awakening request including the available set of preamble sequences of the designated base station via the available time-frequency resource of the designated base station, which can enable the terminal to precisely determine which base station needs to be awakened, thereby avoiding awakening a number of base stations and avoiding mutual interference. Certainly, those skilled in the art should understand that in communication technology preamble sequence, pilot information, reference symbols are just different descriptions for a same concept, and they are the same and equivalent in essence.

In the technical solution, preferably, the method further includes the terminal parsing the pilot information received from the base station to obtain the available set of preamble sequences of the base station.

In the technical solution, when the base station is in the dormant state, the pilot information sent by the base station includes the available set of preamble sequences, thus the base station can be uniquely identified by the designated time-frequency resource, which enables the terminal to only awaken the designated base station using a same time-frequency resource according to the parsed set of preamble sequences when the terminal needs to awaken a base station, thereby avoiding awakening too many base stations (for example, all the base stations using a same time-frequency resource) and accordingly avoiding mutual interference among base stations.

In the above technical solution, preferably, the method further includes the terminal obtaining the pilot information from the base station, obtaining the identity of the base station from the pilot information, and finding the available set of preamble sequences corresponding to the identity of the base station according to a preset table. Wherein, at least the identity of the base station and the available set of preamble sequences of the base station are stored in the preset table in a related manner.

In the technical solution, the identity of the base station can be a physical cell ID (PCI). In the preset table the PCI of each base station and the available set of preamble sequences of the base station are stored in a related manner, which can enable the terminal to directly find the corresponding available set of preamble sequences according to the identity of the base station included in the received pilot information, thus there is no need to query other base stations. Wherein, in the preset table, only one or only some base stations are recorded to increase query efficiency of the terminal. In the preset table, all the base stations can be recorded to increase the probability of that the terminal can successfully find the available set of preamble sequences.

Figure 5:
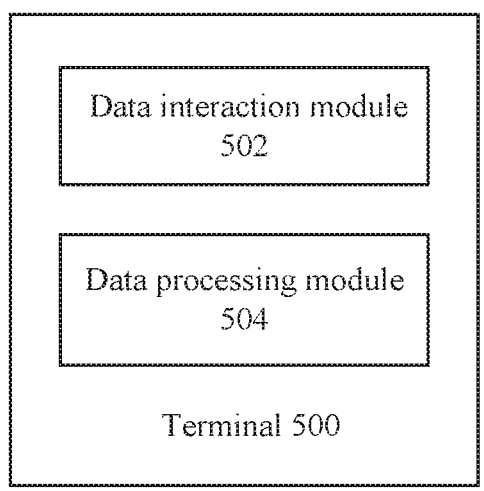
FIG. 5 is a block diagram of a terminal in accordance with another embodiment of the present invention.

FIG. 5 is a block diagram of a terminal in accordance with another embodiment of the present invention.

As shown in FIG. 5, a terminal 500 in accordance with another embodiment of the present invention includes a data interaction module 502 configured to receive pilot information from a base station which is in a dormant state and send an awakening request generated by a data processing module 504, and the data processing module 504 configured to generate an awakening request according to the pilot information. The awakening request is used to request the base station to switch from the dormant state to a work state.

In the technical solution, the base station which is in the dormant state can still send the pilot information, thereby enabling the terminal 500 to generate the awakening request according to the pilot information received from the base station. Thus, when the terminal 500 needs to obtain data and/or voice service from the base station, the terminal 500 can awaken a designated base station which is in the dormant state, thereby avoiding simultaneously awakening a number of base stations by the terminal 500 and accordingly avoiding mutual interference among a number of base stations.

In the technical solution, preferably, the data processing module 504 generates the awakening request automatically, or the data processing module 504 generates the awakening request according to a triggering request received by the data interaction module 502. Wherein, a wireless mobile communication network sends the triggering request to the terminal 500 via the cell where the terminal 500 resides.

In the technical solution, the states of the terminal 500 include an active state and an idle state. When the terminal 500 is in the active state, the terminal 500 needs to obtain the data and/or voice service from the base station, thus the terminal 500 can automatically generate the awakening request (generated in response to user's operation or an application program in the terminal generates the awakening request according to needs) to awaken the dormant base station. When the terminal 500 is in the idle state, if the triggering request from the cell where the terminal 500 resides is received (e.g., network switch demand based on load balance), the terminal 500 can generate the corresponding awakening request to awaken the base station which is in the dormant state.

In the above technical solution, preferably, the data processing module 504 further measures the received pilot information. Wherein, when the measurement result indicates that the value of the characteristic parameter of the pilot information is better than a preset parameter threshold, the data interaction module 502 sends the awakening request to the corresponding base station. Or the data processing module 504 selects specified quantity of optimal pilot information according to the value of the characteristic parameter of each pilot information which is indicated by the measurement result, and the data interaction module 502 sends the awakening request to the corresponding base stations. Or from the pilot information the value of the characteristic parameter of which is better than the preset parameter threshold, the data processing module 504 selects specified quantity of optimal pilot information, and the data interaction module 502 sends the awakening request to the corresponding base stations.

In the technical solution, the terminal 500 can measure the characteristic parameter of the base station according to the pilot information sent by the base station, for example reference signal receiving power (RSRP) in a protocol specification and/or reference signal receiving quality (RSRQ). The terminal 500 can send the awakening request to the base station the value of the characteristic parameter of the pilot information sent by which is better than the preset parameter threshold, which can ensure that when the base station is awakened, good communication quality can be obtained. The terminal 500 can send the awakening request to the base stations corresponding to specified quantity of pilot information according to the value of the characteristic parameter. The terminal 500 can select specified quantity of pilot information from the pilot information the value of which characteristic parameter is better than the preset parameter threshold, and sends the awakening request to the corresponding base stations. If the terminal 500 sends the awakening request to a number of base stations at the same time, when the plurality of base stations receive the awakening request, the base stations can negotiate with each other to finally determine which base station needs to be awakened, thereby ensuring that the number of the awakened base station is least, and accordingly avoiding interference among a number of base stations. The awakening request can be a random access channel (RACH), a sounding reference signal (SRS), or other similar request information.

In the above technical solution, preferably, the data interaction module 502 is further configured to obtain an available time-frequency resource and an available set of preamble sequences of the base station from the cell where the terminal resides. The data processing module 504 is further configured to generate the awakening request including the specified preamble sequence, and the data interaction module 502 sends the awakening request via the available time-frequency resource.

In the technical solution, the base station can be uniquely identified by the time-frequency resource and the available set of preamble sequences of the base station. The terminal 500 sends the awakening request including the available set of preamble sequences of the designated base station via the available time-frequency resource of the designated base station, which can enable the terminal 500 to precisely determine which base station needs to be awakened, thereby avoiding awakening a number of base stations and avoiding mutual interference. Certainly, those skilled in the art should understand that in communication technology preamble sequence, pilot information, reference symbols are just different descriptions for a same concept, and they are the same and equivalent in essence.

In the technical solution, preferably, the data processing module 504 is further configured to parse the pilot information which is received from the base station by the data interaction module 502 to obtain the available set of preamble sequences of the base station.

In the technical solution, when the base station is in the dormant state, the pilot information sent by the base station includes the available set of preamble sequences, thus the base station can be uniquely identified by the designated time-frequency resource, which enables the terminal 500 to only awaken a designated base station using a same time-frequency resource according to the parsed set of preamble sequences when the terminal 500 needs to awaken a base station, thereby avoiding awakening too many base stations (for example, all the base stations using a same time-frequency resource) and accordingly avoiding mutual interference among base stations.

In the above technical solution, preferably, the data processing module 504 is further configured to obtain the identity of the base station from the pilot information received from the base station by the data interaction module 502, and find the available set of preamble sequences corresponding to the identity of the base station according to a preset table. Wherein, at least the identity of the base station and the available set of preamble sequences of the base station are stored in the preset table in a related manner.

In the technical solution, the identity of the base station can be a physical cell ID (PCI). In the preset table the PCI of each base station and the available set of preamble sequences of the base station are stored in a related manner, which can enable the terminal 500 to directly find the corresponding available set of preamble sequences according to the identity of the base station included in the received pilot information, thus there is no need to query other base stations. Wherein, in the preset table, only one or only some base stations are recorded to increase query efficiency of the terminal. In the preset table, all the base stations can be recorded to increase the probability of that the terminal 500 can successfully find the available set of preamble sequences.

Figure 6:
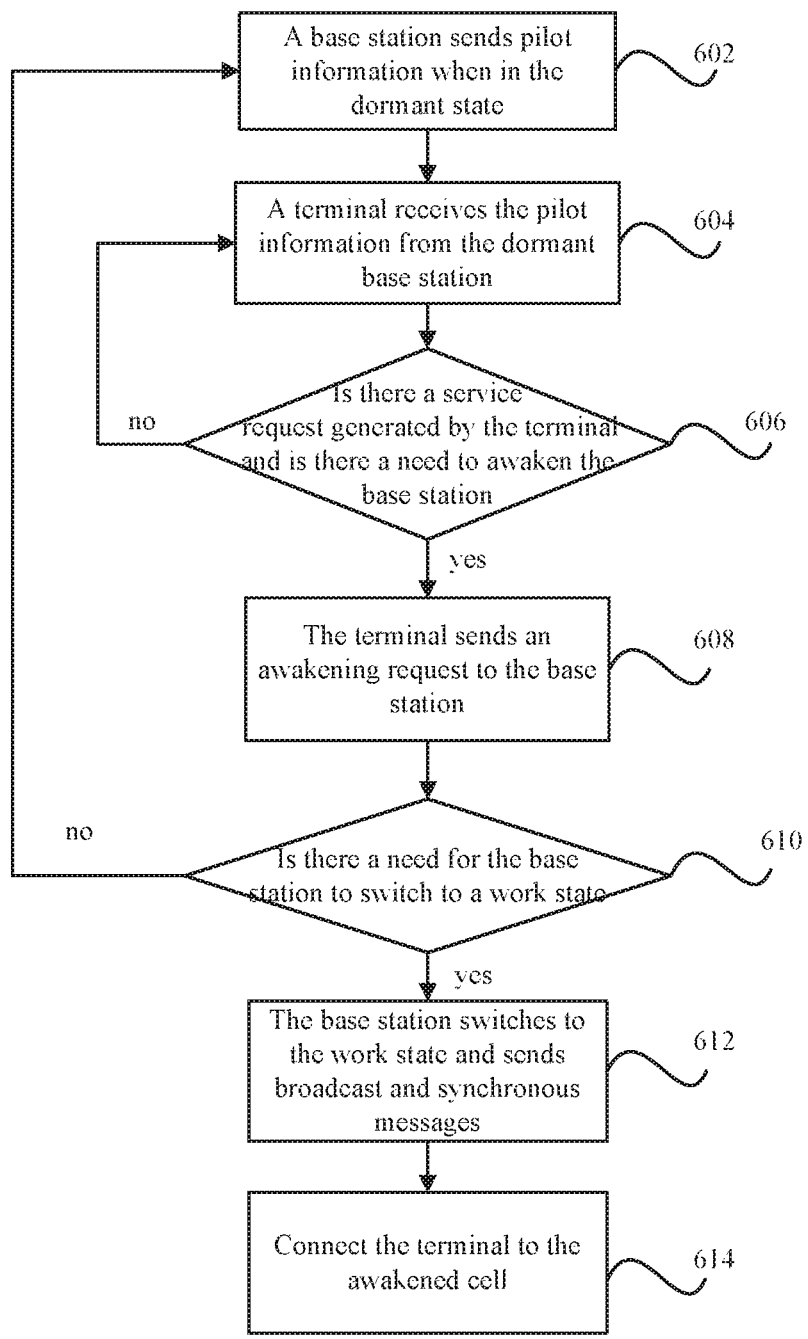
FIG. 6 is a detailed flow chart of a cell interference coordination method in accordance with an exemplary embodiment of the present invention.

FIG. 6 is a detailed flow chart of a cell interference coordination method in accordance with an exemplary embodiment of the present invention.

As shown in FIG. 6, a cell interference coordination method in accordance with an exemplary embodiment of the present invention includes the following.

In step 602, a base station stopping sending synchronous and broadcast messages after the base station switches from a work state to a dormant state, so as to reduce interference for other base stations. However as the base station stops sending messages, the terminal cannot find the base station, and thus the terminal cannot awaken the base station when the terminal needs to awaken the base station. Thus, the base station also needs to send cell pilot information when in the dormant state, which can enable the terminal to find the base station according to the pilot information sent by the base station, thereby ensuring that the terminal can awaken the dormant base station in time when data transmission and/or voice service is needed.

Specifically, the pilot information can be a cell-specific reference signal (CRS), and can be also a part of information of the CRS which may not bring interference or bring less interference for other stations. The pilot information can be also other pilot information supported by a protocol, for example, a channel state information reference signal (CSI-RS), or a part of the information of the CSI-RS, and it should make sure that the interference brought by the part of the information of the CSI-RS cannot exceed a certain interference threshold.

Also, although in order to reduce interference for other base stations, the base station executes state switch, to ensure that the terminals in the cell corresponding to the base station can communicate with others normally, the base station can also determine whether or not to enter the dormant state according to specific conditions. Wherein, when the state of the base station satisfies any of the following conditions, the base station switches to the dormant state.

1) In the cell there is no terminal in an active state and no terminal in an idle state. Under this condition, when there is no terminal in the cell corresponding to the base station, the base station directly enters the dormant state.

2) Or in the cell there is no terminal in the active state. Under this condition, for the reason that the terminal in the active state needs to receive data and/or voice service from the base station, while the terminal in the idle state only needs to reside in the cell to receive corresponding base station information, therefore, when it make sure that in the cell there is no terminal in the active state, interference for normal communication of the terminal can be reduced to be least.

3) Or in the cell there is only one or more terminals in the idle state and there is one or more other cells where the one or more terminals in the idle state can reside. Under this condition, when in the cell there is no terminal in the active state, for the terminal in the idle state, when there is one other cell available for the terminal to reside, interference for the terminal can be reduced to be least.

4) Or in the cell there is one or more terminals in the active state and one or more terminals in the idle state and there is one or more other cells where the one or more terminals in the active state and the one or more terminals in the idle state can reside. Under this condition, no matter whether in the cell there is one or more terminals in the active state or there is one or more terminals in the idle state, only when there is one or more other cells available for the terminals to reside, to a great degree interference for normal communication of the terminals can be reduced.

Specifically, the base station can determine whether or not there is one or more other cells available for a terminal to reside in various ways. For example, when the base station determines that around the terminal there is a cell having better signal (e.g., signal power is greater than or equals to a preset power threshold, or signal quality is greater than or equals to a preset quality threshold) according to a measurement report uploaded by the terminal, the base station determines that the terminal can reside in the cell. Or the base station can obtain the position of the terminal, and thus when the base station determines that there is a cell near the terminal, the base station determines that the terminal can reside in the cell. Or other ways can be adopted.

Additionally, the base station sends an available time-frequency resource and an available set of preamble sequences of the base station before the base station switches from the work state to the dormant state, which enables other surrounding base stations to receive these information to allow the terminal to awaken the above base station. Or after the base station enters the dormant state, the base station sends the pilot information including the available set of preamble sequences, and the terminal can directly obtain the above information. The base station can be uniquely identified by the time-frequency resource and the available set of preamble sequences of the base station. The base station sends the available time-frequency resource and the available set of preamble sequences of the base station before the base station switches from the work state to the dormant state, which can enable other base stations and the terminal to determine which base station has entered the dormant state according to the received time-frequency resource and the received set of preamble sequence. When the terminal needs to awake a designated base station, the terminal only needs to send the awakening request including the available preamble sequence of the designated base station via the time-frequency of the designated base station, and the terminal can awaken the designated base station precisely. While other base stations can determine which station has entered the dormant state according to the received time-frequency resource and the set of preamble sequences, thus the other base stations can determine that the other base stations cannot bring interference for the base station which has entered the dormant state. The base station sends the available set of preamble sequence when in the dormant state, and different base stations using the designated time-frequency resource have been identified by different identities, thus only the designated base station can be awakened when it needs to awaken a base station, thereby avoiding awakening all the base stations using a same time-frequency resource and avoiding interference among base stations.

In step 604, the terminal measuring a performance parameter of the dormant cell according to the received pilot information. Wherein, the measured performance parameter can be a reference signal receiving power (RSRP) in a protocol specification and/or a reference signal receiving quality (RSRQ), and can also be one other parameter indicating signal intensity and signal to noise ratio of the cell.

In step 606, determining whether or not there is a service request from the terminal and determining whether or not it needs to awaken the base station. If yes, step 608 is executed, otherwise, the procedure returns to step 604. When the terminal is in the active state, the service request, for example, data access, voice call, or other, is sent by itself. When the terminal is in the idle state, the terminal generates the service request according to a triggering request received from the cell where the terminal resides (e.g., network switch demand based on load balance).

In step 608, the terminal transmitting an awakening request to the base station when it is determined that the terminal generates the service request.

Wherein, in order to avoid awakening too many base stations and accordingly avoid mutual interference, and also in order to reduce power consumption of the base station, the number of awakened base stations should be as least as possible. Therefore, the terminal can transmit the awakening request to the base station the value of the characteristic parameter of which pilot information is better than a preset parameter threshold, which can ensure that when the base station is awakened, good communication can be obtained. For example, the terminal can determine the communication quality of the base station according to the performance parameter of the base station measured in step 604.

To control the number of the awakened base stations, the terminal can arrange the values of the characteristic parameters in an order, and select the base stations corresponding to specified number of the pilot information (e.g., select from the optimal value to the worst value), and send the awakening request. The terminal can also only transmit the awakening request to the base station the value of which characteristic parameter is optimal. Wherein, the awakening request can be a random access control (RACH), a sounding reference signal (SRS), or other similar request information.

The awakening request sent by the terminal includes the preamble sequence of a designated base station, which can enable the terminal to precisely determine which base station needs to be awakened, thereby avoiding awakening a number of base stations at the same time, and accordingly avoiding mutual interference. There may be a number of base stations using a same time-frequency resource, and the preamble sequences of different base stations using different time-frequency resource may be the same. Thus for the reason that the terminal can precisely determine which base station needs to be awakened, the base station can be set to receive the awakening request from the designated time-frequency resource, and the base station which needs to be awakened can be precisely determined according to the preamble sequence of the awakening request.

In step 610, the base station determining whether or not to switch to the work state after receiving the awakening request from the terminal. If it is determined to switch to the work state, step 612 is executed, otherwise the procedure returns to step 602.

Specifically, to avoid awakening too many base stations and avoid mutual interference, when the base station receives the awakening request, after executing some determination steps, the base station determines whether or not to execute state switch. For example, the base station can instantly execute state switch after receiving the awakening request. The base station can also switch from the dormant state to the work state when it is determined that a number of awakening requests from a number of terminals are received within a preset time interval. Therefore, it can make sure that after the base station is awakened, there are enough service requests. Also as the number of the awakened base stations is reduced, interference among a number of base stations can be avoided, and power consumption of the base station is also reduced.

Furthermore, when the base station receives the awakening request and determines that the base station will not bring interference for other base stations, the base station switches from the dormant state to the work state, which can enhance work performance of the base station. For example, the base station can determine whether or not to execute state switch according to real time state of surrounding base stations. When the surrounding base stations are in the dormant state, it is determined that interference cannot be generated. Or the base station can detect signals of the surrounding base stations. When the signal intensity is weak (less than or equals to a preset parameter threshold), it is determined that interference cannot be generated.

In step 612, the base station transmitting broadcast and synchronous messages normally after switching from the dormant state to the work state. Thus, the base station can communicate with the terminal normally and can transmit messages to and receive messages from the terminal. The base station can also inform the base stations which have received the same awakening request that there is no need for these base stations to execute state switch, thereby avoiding awakening too many base stations and avoiding mutual interference.

In the above process, by means of negotiation among the base stations, which base station needs to switch from the dormant state to the work state can be finally determined, which reduces the number of awakened base stations, reduces interference among base stations, thus an optimal technical solution for awakening base stations can be realized. Specifically, when the base stations negotiate with each other, the base station which can provide optimal signal quality for the terminal sending the awakening request may be selected, and/or the base station the number of the awakening requests received by which is greatest can be selected. The base stations can negotiate with each other via return links or air interface information.

In step 614, connecting the terminal to the awakened base station according to information of the base station. The terminal can determine the awakened base station according to the broadcast and synchronous message or the special awakening notification message, thus the terminal can be precisely connected to the awakened base station.

According to embodiments of the present invention, the present invention further provides a program product stored in a non-volatile machine readable medium to execute a cell interference coordination process. The program product includes machine executable instructions executed by the computer system to realize the following steps: a base station stopping sending other information other than pilot information after the base station switches to a dormant state from a work state.

According to embodiments of the present invention, the present invention further provides a non-volatile machine readable medium storing a program product for executing a cell interference coordination process. The program product includes machine executable instructions executed by the computer system to realize the following steps: a base station stopping sending other information other than pilot information after the base station switches to a dormant state from a work state.

According to embodiments of the present invention, the present invention further provides a machine-readable program configured to enable the machine to execute any of the cell interference coordination methods described in the above technical solutions.

According to embodiments of the present invention, the present invention further provides a storage medium storing a machine readable program. Wherein, the machine-readable program is configured to enable the machine to execute any of the cell interference coordination methods described in the above technical solutions.

The above specifically illustrates the technical solution of the present invention in conjunction with the accompanying drawings. In related art, to avoid mutual interference among a number of cells, the cell where data transmission is not needed is set to enter the dormant state. However, the terminal cannot find the dormant cell, and cannot awaken the dormant cell when data transmission is needed. Therefore, the present invention provides a new cell interference coordination solution, which can cause the base station to send the pilot information when in the dormant state. Thus interference for other base stations can be avoided, and also the terminal can awaken the dormant base station according to the received pilot information when the dormant base station needs to be awakened.

The foregoing descriptions are merely preferred embodiments of the present disclosure, rather than limiting the present disclosure. Various modifications and alterations may be made to the present disclosure for those skilled in the art. Any modification, equivalent substitution, improvement or the like made within the spirit and principle of the present disclosure shall fall into the protection scope of the present disclosure.

What is claimed is:

1. A method for cell interference coordination, comprising:
   receiving, from a designated time-frequency source and by a base station, an awakening request comprising a designated preamble sequence, upon which the base station switches from a dormant state to a work state;
   before the base station switches from the work state to the dormant state, sending, by the base station, an available time-frequency resource and an available set of preamble sequences of the base station; and
   after the base station switches from the work state to the dormant state, stopping sending other information other than pilot information.

2. The method of claim 1, wherein the method further comprises the base station switching to the dormant state from the work state when the base station determines that the base station satisfies a preset state switch condition; and
   the preset state switch condition comprises at least one of:
   in the cell there is no terminal in an active state and no terminal in an idle state;
   in the cell there is no terminal in the active state;
   in the cell there is only one or more terminals in the idle state and there is one or more other cells where the one or more terminals in the idle state are able to reside; and
   in the cell there is one or more terminals in the active state and one or more terminals in the idle state, and there is one or more other cells where the one or more terminals in the active state and the one or more terminals in the idle state are able to reside.

3. The method of claim 1, wherein the method further comprises at least one of:
   the base station switching from the dormant state to the work state once the base station receives the awakening request;
   the base station switching from the dormant state to the work state when the base station receives a number of awakening requests from a number of terminals within a preset time interval; and
   the base station switching from the dormant state to the work state when the base station determines that the base station is able to bring interference for other base stations.

4. The method of claim 3, wherein the process of the base station determining whether or not the base station is able to bring interference for other base stations comprises:
   the base station obtaining real time state information of a designated base station, or obtaining a characteristic parameter of signals from the designated base station; and
   when the designated base station is in the dormant state, or when the value of the characteristic parameter is less than or equals to a preset parameter threshold, it is determined that the base station is not able to bring interference for the designated base station.

5. The method of claim 1, wherein after the base station receives the awakening request, the method further comprises:
   the base station generating and broadcasting an awakening notification message, or receiving one or more awakening notification messages from one or more other base stations, the awakening notification message generated by the base station at least comprises an identity of the base station and an identity of the sender sending the awakening request, and the awakening notification message indicates that the base station will switch from the dormant state to the work state according to the awakening request from the sender;
   when the base station sends the awakening notification message and does not receive a corresponding response message, the base station switches from the dormant state to the work state;
   when the base station receives the response message, the base station negotiates with the sender sending the response message to finally determine which base station needs to switch from the dormant state to the work state; and
   when the base station receives one awakening notification message from one other base station, the base station returns a corresponding response message or makes no response.

6. The method of claim 1, wherein the awakening request comprises information of all target base stations, and when the awakening request has been sent to other base stations, the method further comprising:

the base station directly negotiating with the other base stations to finally determine which base station needs to switch from the dormant state to the work state.

7. The method of claim 1, wherein the pilot information sent by the dormant base station comprises an available set of preamble sequences.

8. A computer system, comprising:
a non-volatile memory; and
the computer system is configured to execute machine-readable instructions stored in the non-volatile memory to:
control a base station to switch from a work state to a dormant state, wherein an available time-frequency resource and an available set of preamble sequences of the base station are sent before the base station switches from the work state to the dormant state;
stop sending other information other than pilot information when the base station is in the dormant state; and
control the base station to switch from the dormant state to the work state upon receiving an awakening request from a designated time-frequency resource, the awakening request comprising a designated preamble sequence.

9. The computer system of claim 8, wherein the computer system is further configured to execute machine-readable instructions stored in the non-volatile memory to determine whether or not the base station matches a preset state switch condition, and control the base station to switch from the work state to the dormant state when the base station matches the preset state switch condition; and
the preset state switch condition comprises at least one of:
in the cell there is no terminal in an active state and no terminal in an idle state;
in the cell there is no terminal in the active state;
in the cell there is only one or more terminals in the idle state and there is one or more other cells where the one or more terminals in the idle state are able to reside; and
in the cell there is one or more terminals in the active state and one or more terminals in the idle state, and there is one or more other cells where the one or more terminals in the active state and the one or more terminals in the idle state are able to reside.

10. The computer system of claim 8, wherein the instructions to control the base station to switch from the dormant state to the work state upon receiving an awakening request further comprise instructions to:
control the base station to switch from the dormant state to the work state once the data interaction module receives the awakening request;
or control the base station to switch from the dormant state to the work state when a number of awakening requests are received from a number of terminals within a preset time interval; and wherein the computer system is further configured to execute machine-readable instructions stored in the non-volatile memory to:

determine whether or not the base station is able to bring interference for other base stations; and
control the base station to switch from the dormant state to the work state when it is determined that the base station is not able to bring interference for other base stations.

11. The computer system of claim 10, wherein whether or not the base station is able to bring interference for other base station is determined based on one of:
real time state information of a designated base station obtained by the data interaction module, and a characteristic parameter of signals from the designated base station obtained by the data interaction module; and wherein
when it is determined that the base station is in the dormant state, or that the value of the characteristic parameter is less than or equals to a preset parameter threshold, the base station is determined to be not able to bring interference for the designated base station.

12. The computer system of claim 8, wherein the computer system is further configured to execute machine-readable instructions stored in the non-volatile memory to:
generate an awakening notification message, the awakening notification message comprising an identity of the base station and an identity of the sender sending the awakening request, wherein the awakening notification message indicates that the base station will switch from the dormant state to the work state according to the awakening request from the sender;
broadcast the awakening notification message, or receive one or more awakening notification messages from one or more other base stations;
when the awakening notification message is sent and a corresponding response message is not received, control the base station to switch from the dormant state to the work state;
when the corresponding response message is received, negotiate with the sender sending the response message to finally determine which base station needs to switch from the dormant state to the work state;
when an awakening notification message is received from one other base station, generate a corresponding response message or make no response.

13. The computer system of claim 8, wherein the computer system is further configured to execute machine-readable instructions stored in the non-volatile memory to
parse the awakening request to obtain information of all target base stations;
when the awakening request is further sent to one or more other base stations, directly negotiate with the one or more other base stations to finally determine which base station needs to switch from the dormant state to the work state.

14. The computer system of claim 8, wherein the pilot information comprises an available set of preamble sequences of the base station when the base station is in the dormant state.

* * * * *